US012679000B2

(12) United States Patent
Oda et al.

(10) Patent No.: US 12,679,000 B2
(45) Date of Patent: Jul. 14, 2026

(54) SHEET MOLDING COMPOUND PRODUCTION METHOD AND FIBER MAT DEPOSITION DEVICE

(71) Applicant: Mitsubishi Chemical Corporation, Tokyo (JP)

(72) Inventors: Kentaro Oda, Tokyo (JP); Yasushi Watanabe, Tokyo (JP); Tadao Samejima, Tokyo (JP); Yukihiro Mizutori, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 202 days.

(21) Appl. No.: 18/404,652

(22) Filed: Jan. 4, 2024

(65) Prior Publication Data

US 2024/0141569 A1     May 2, 2024

Related U.S. Application Data

(63) Continuation of application No. PCT/JP2022/027280, filed on Jul. 11, 2022.

(30) Foreign Application Priority Data

Jul. 15, 2021    (JP) ................................. 2021-116973
May 12, 2022    (JP) ................................. 2022-078871

(51) Int. Cl.
*D01G 1/10*          (2006.01)
*B29B 11/16*         (2006.01)
          (Continued)

(52) U.S. Cl.
CPC ............ *B29B 11/16* (2013.01); *B29B 15/122* (2013.01); *B29C 70/12* (2013.01)

(58) Field of Classification Search
CPC .... C08J 5/243; C08J 5/24; C08J 5/241; B02C 18/2291; D01G 1/10; D01G 1/04
See application file for complete search history.

(56) References Cited

U.S. PATENT DOCUMENTS 2,719,336 A * 10/1955 Stotler ..................... D04H 1/00
                                                              19/305
2,792,075 A * 5/1957 Mcbride ................... B04C 5/28
                                                              55/525

(Continued)

FOREIGN PATENT DOCUMENTS

JP        2002-317371 A        10/2002
JP        2003-251589 A        9/2003
          (Continued)

OTHER PUBLICATIONS

International Search Report issued in corresponding International Patent Application No. PCT/JP2022/027280 dated Aug. 23, 2022.
(Continued)

*Primary Examiner* — Matthew J Daniels
(74) *Attorney, Agent, or Firm* — Morgan, Lewis & Bockius LLP

(57) ABSTRACT

A method of manufacturing a sheet molding compound (SMC) according to an aspect of the present invention comprises: (i) drawing out a carrier film from a roll to travel on a conveyance path such that the surface of the carrier film is horizontal; (ii) cutting a continuous carbon fiber bundle into short carbon fiber bundles with a chopper disposed above the conveyance path; (iii) allowing the short carbon fiber bundles to fall onto the carrier film traveling on the conveyance path while dispersing them using a dispersing roll disposed below the chopper to deposit a carbon fiber mat on the carrier film; (iv) impregnating the carbon fiber mat with a thermosetting resin composition to obtain a resin-impregnated carbon fiber mat; and v) concurrently with the
(Continued)

deposition of the carbon fiber mat, removing fiber dust generated from the short carbon fiber bundles due to contact with the dispersing roll using a dust collector.

17 Claims, 16 Drawing Sheets

(51) Int. Cl.

|  |  |
|---|---|
| *B29B 15/12* | (2006.01) |
| *B29C 70/12* | (2006.01) |

(56) References Cited

U.S. PATENT DOCUMENTS

| | | | | |
|---|---|---|---|---|
| 2,989,252 | A * | 6/1961 | Babb | ................... B02C 18/2291 |
| | | | | 241/60 |
| 3,992,967 | A * | 11/1976 | Fram | ........................ C03B 37/16 |
| | | | | 83/913 |
| 10,569,986 | B2 | 2/2020 | Motohashi et al. | |
| 2017/0266596 | A1 * | 9/2017 | Huntley | ................ A47L 7/0071 |

| | | | | |
|---|---|---|---|---|
| 2018/0162070 | A1 | 6/2018 | Iwata et al. | |
| 2019/0177888 | A1 * | 6/2019 | Motohashi | .............. B29B 15/12 |
| 2020/0340146 | A1 | 10/2020 | Kawahara et al. | |
| 2021/0323196 | A1 | 10/2021 | Ono et al. | |
| 2022/0176647 | A1 | 6/2022 | Yamanaka et al. | |

FOREIGN PATENT DOCUMENTS

| | | | |
|---|---|---|---|
| JP | 2017-222108 | A | 12/2017 |
| JP | 2019-119148 | A | 7/2019 |
| JP | 2020-028844 | A | 2/2020 |
| JP | 2021-011644 | A | 2/2021 |
| JP | 2022-029523 | A | 2/2022 |
| WO | 2019/142851 | A1 | 7/2019 |
| WO | 2020/090877 | A1 | 5/2020 |
| WO | 2020/195756 | A1 | 10/2020 |
| WO | 2021/010084 | A1 | 1/2021 |

OTHER PUBLICATIONS

Extended European Search Report issued in corresponding European Patent Application No. 22842084.0, dated Oct. 1, 2024.

* cited by examiner

M DIRECTION

M DIRECTION

M DIRECTION

M DIRECTION

M DIRECTION

SHEET MOLDING COMPOUND PRODUCTION METHOD AND FIBER MAT DEPOSITION DEVICE

TECHNICAL FIELD

The present invention mainly relates to a method of manufacturing a sheet molding compound (SMC), particularly a method of manufacturing an SMC using carbon fibers (CF) as a reinforcement (CF-SMC), and a fiber mat deposition apparatus used for the manufacture of a CF-SMC.

The present application is a continuation application of International Application No. PCT/JP2022/027280, filed on Jul. 11, 2022, which claims priority of Japanese Patent Application No. 2021-116973, filed Jul. 15, 2021, and Japanese Patent Application No. 2022-078871, filed May 12, 2022, the contents of which are incorporated herein by reference.

BACKGROUND ART

Carbon fiber reinforced plastics (CFRP) are lightweight composite materials with excellent mechanical characteristics, which are suitable for parts of manned aircraft, unmanned aircraft, automobiles, ships, railway vehicles, and other transportation equipment, and the importance of the materials has increased steadily in recent years.

A material preferably used when manufacturing CFRP products by compression molding is a carbon fiber prepreg, which is an intermediate material. A carbon fiber prepreg is obtained by impregnating a reinforcement comprising carbon fibers with an uncured thermosetting resin composition.

A CF-SMC is a kind of carbon fiber prepreg, and in a manufacturing process thereof, a continuous carbon fiber bundle is cut with a chopper into short carbon fiber bundles, which are allowed to fall onto a traveling carrier film to form a carbon fiber mat. A CF-SMC is made by impregnating the carbon fiber mat with a thermosetting resin composition.

There has been proposed a fiber mat manufacturing apparatus in which a pin roll or a cage roll is disposed between a chopper and a conveyance path of a carrier film for the purpose of letting the short fiber bundles falling from the chopper onto the carrier film disperse uniformly or split by hitting into smaller bundles (Patent Document 1 and Patent Document 2).

CITATION LIST

Patent Documents

Patent Document 1

PCT International Publication No. WO 2019/142851

Patent Document 2

PCT International Publication No. WO 2021/010084

SUMMARY OF INVENTION

Technical Problem

When short carbon fiber bundles are brought into contact with a dispersing roll such as a pin roll or a cage roll, fiber dust is generated due to the impact. Fiber dust may float due to the influence of an air flow generated by rotation of the dispersing roll and then may adhere to, for example, the surface of a member of an SMC manufacturing apparatus to form lint. When largely grown lint falls and mixes into the carbon fiber mat, poor impregnation occurs in that portion. Since the CF-SMC does not sufficiently flow in a poorly impregnated part, there is a risk that a CF-SMC with a poorly impregnated part may damage a mold when used for compression molding.

The fiber dust also has a risk of contaminating mechanical elements included in the SMC manufacturing apparatus or deteriorating the work environment in a room in which the SMC manufacturing apparatus is installed. Since fiber dust generated from carbon fibers has electrical conductivity, the fiber dust may impair the operation of electrical and electronic equipment.

Objects of the present invention include providing a manufacturing technology for CF-SMC capable of suppressing lint originating from the fiber dust from incorporation into a product despite using a dispersing roll.

Objects of the present invention further include providing a fiber mat deposition apparatus capable of suppressing an adverse effect of the fiber dust on a mechanical element included in an SMC manufacturing apparatus or a work environment in a room in which an SMC manufacturing apparatus is installed.

In the present specification, problems that can be solved by each embodiment of the present invention may be explicitly or implicitly disclosed.

Solution to Problem

According to an aspect of the present invention, there is provided a method of manufacturing a sheet molding compound, the method comprising: (i) drawing out a carrier film from a roll to travel on a conveyance path such that the surface of the carrier film is horizontal; (ii) cutting a continuous carbon fiber bundle into short carbon fiber bundles with a chopper disposed above the conveyance path; (iii) allowing the short carbon fiber bundles to fall onto the carrier film traveling on the conveyance path while dispersing them using a dispersing roll disposed below the chopper to deposit a carbon fiber mat on the carrier film; (iv) impregnating the carbon fiber mat with a thermosetting resin composition to obtain a resin-impregnated carbon fiber mat; and (v) concurrently with the deposition of the carbon fiber mat, removing fiber dust generated from the short carbon fiber bundles due to contact with the dispersing roll using a dust collector.

According to another aspect of the present invention, there is provided a method of manufacturing a sheet molding compound using a fiber mat deposition apparatus comprising a chopping part and a dispersing part disposed below the chopping part, the method comprising: (i) drawing out a carrier film from a roll to travel on a conveyance path such that the surface of the carrier film is horizontal; (ii) cutting a continuous carbon fiber bundle into short carbon fiber bundles in the chopping part of the fiber mat deposition apparatus disposed above the conveyance path; (iii) allowing the short carbon fiber bundles to fall onto the carrier film traveling on the conveyance path while dispersing them in the dispersing part of the fiber mat deposition apparatus using a dispersing roll having a rotation axis parallel to a T direction to deposit a carbon fiber mat on the carrier film; (iv) impregnating the carbon fiber mat with a thermosetting resin composition to obtain a resin-impregnated carbon fiber mat; and (v) concurrently with the deposition of the carbon fiber mat, removing fiber dust generated from the short carbon fiber bundles due to contact with the dispersing roll using one or more dust collectors.

According to still another aspect of the present invention, there is provided a fiber mat deposition apparatus disposed above a conveyance path and used for depositing a carbon fiber mat on a carrier film that travels on the conveyance path with its surface horizontal, the fiber mat deposition apparatus comprising: a chopping part for cutting a continuous carbon fiber bundle into short carbon fiber bundles; and a dispersing part disposed below the chopping part for allowing the short carbon fiber bundles to fall onto the carrier film while dispersing them using a dispersing roll having a rotation axis parallel to a T direction, wherein the dispersing part is disposed on the inside of an enclosure, and at least one end of a shaft of the dispersing roll protrudes to the outside of the enclosure through an opening provided in the enclosure.

According to still another aspect of the invention, there is provided a fiber mat deposition apparatus disposed above a conveyance path and used for depositing a carbon fiber mat on a carrier film that travels on the conveyance path with its surface horizontal, the fiber mat deposition apparatus comprising: a chopping part for cutting a continuous carbon fiber bundles into short carbon fiber bundles; and a dispersing part disposed below the chopping part for allowing the short carbon fiber bundles to fall onto the carrier film while dispersing them using a dispersing roll having a rotation axis parallel to a T direction, wherein the dispersing part is disposed on the inside of an enclosure, each of both ends of a shaft of the dispersing roll protrudes out of the enclosure through an opening provided in the enclosure, and a pair of bearings supporting the shaft are both disposed on the outside of the enclosure.

According to still another aspect of the present invention, there is provided a fiber mat deposition apparatus comprising: a chopping part for cutting a continuous carbon fiber bundle into short carbon fiber bundles; and a dispersing part disposed below the chopping part for allowing the short carbon fiber bundles to fall onto a carrier film while dispersing them using a dispersing roll, wherein the dispersing part is disposed on the inside of an enclosure, and the enclosure is formed of metal plates and is grounded.

According to still another aspect of the present invention, there is provided a sheet molding compound manufacturing apparatus comprising a fiber mat deposition apparatus, two applicators, a laminator, an impregnator, and one or more dust collectors.

Advantageous Effects of Invention

According to an aspect of the present invention, there is provided a manufacturing technology for CF-SMC capable of suppressing lint originating from fiber dust generated from short carbon fiber bundles due to contact with a dispersing roll from incorporation into a product.

According to another aspect of the present invention, there is provided a fiber mat deposition apparatus that can suppress an adverse effect of fiber dust generated from short carbon fiber bundles due to contact with a dispersing roll, on a mechanical element included in an SMC manufacturing apparatus or a work environment in a room where an SMC manufacturing apparatus is installed.

BRIEF DESCRIPTION OF DRAWINGS

FIG. 4 is a schematic diagram of a pin roll.

FIG. 7 is a schematic diagram of a fiber mat deposition apparatus.

FIG. 10 is a schematic diagram of a suction nozzle.

DESCRIPTION OF EMBODIMENTS

The term "T direction" as used in the present specification means a direction that is horizontal and is perpendicular to an M direction. The M direction is a traveling direction of the carrier film at the time of manufacturing a CF-SMC. For example, in FIG. 1, FIG. 2, FIGS. 11 to 13, FIG. 16, and FIG. 17, the T direction is perpendicular to the paper surface.

The term "metal" as used in the present specification includes not only a simple metal substance but also an alloy.

1. SMC Manufacturing Apparatus

Figure 1:
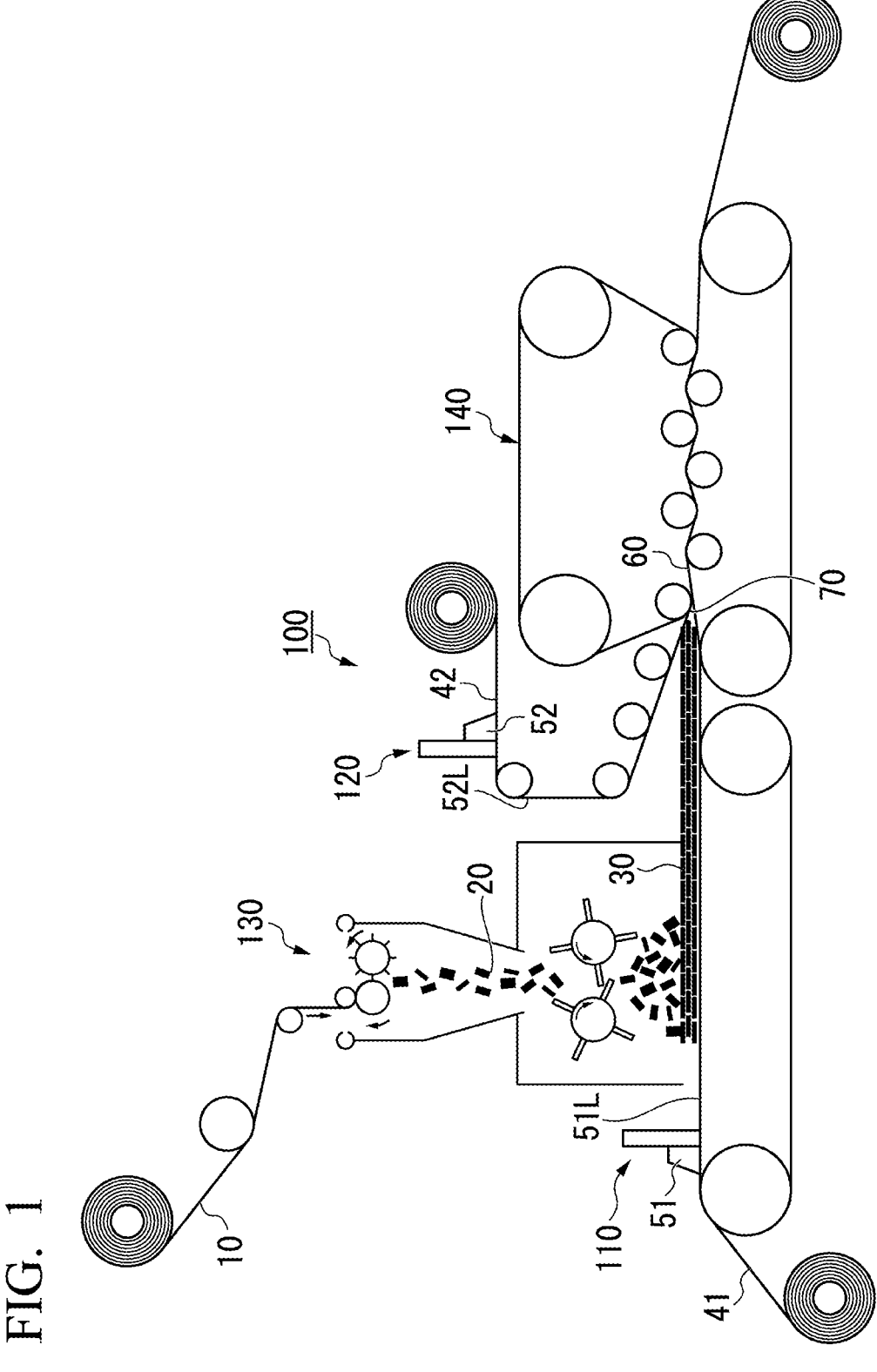
FIG. 1 is a schematic diagram of an SMC manufacturing apparatus.

An example of an SMC manufacturing apparatus that can be preferably used in the method of manufacturing a CF-SMC according to the embodiment is shown in FIG. 1.

In FIG. 1, an SMC manufacturing apparatus 100 has a first applicator 110, a second applicator 120, a fiber mat deposition apparatus 130, and an impregnator 140.

The first applicator 110 is used to apply a first resin paste 51 on a first carrier film 41 to form a first resin paste layer 51L.

The second applicator 120 is used to apply a second resin paste 52 on a second carrier film 42 to form a second resin paste layer 52L.

Figure 2:
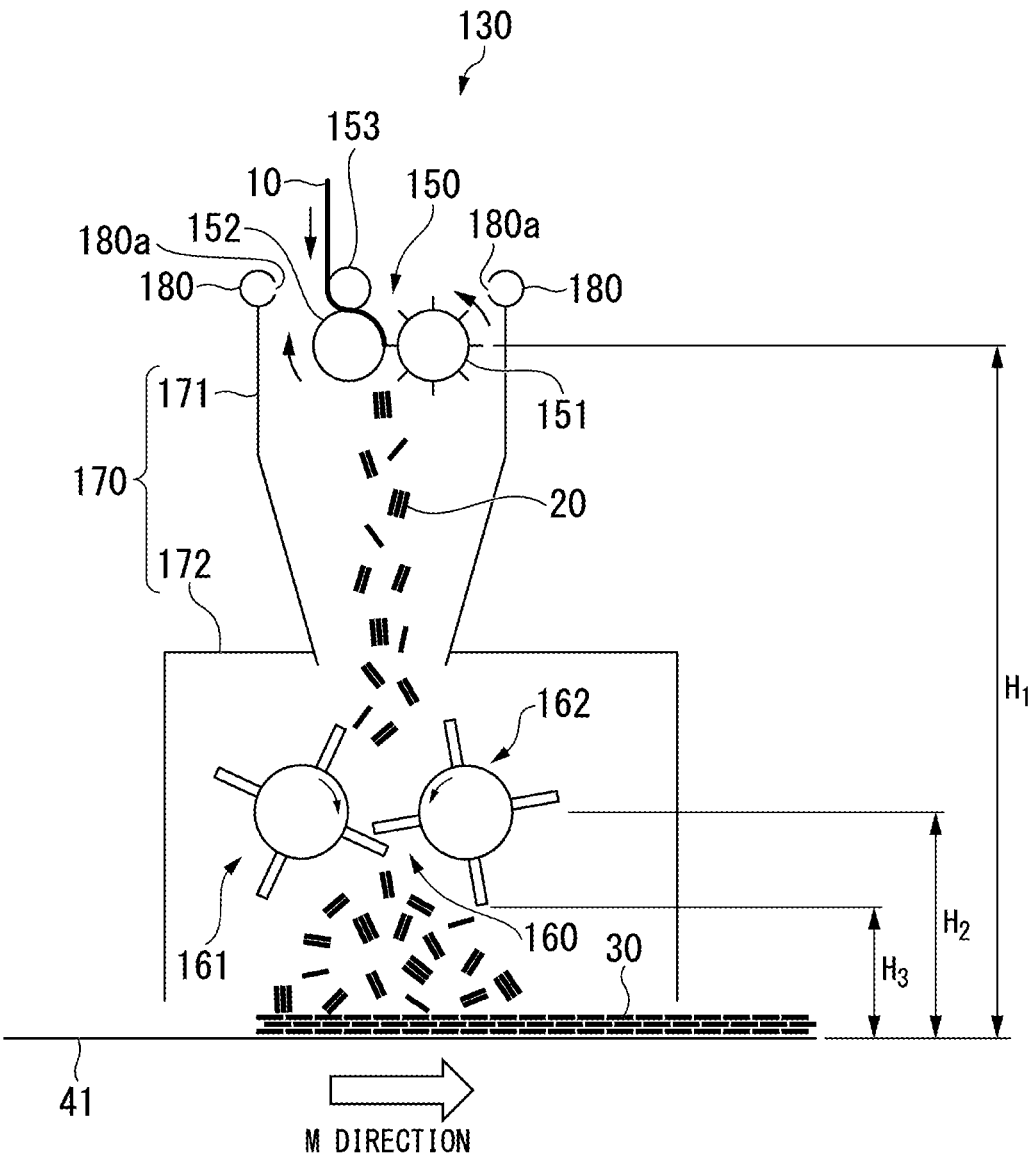
FIG. 2 is a schematic diagram of a fiber mat deposition apparatus.
Figure 3:
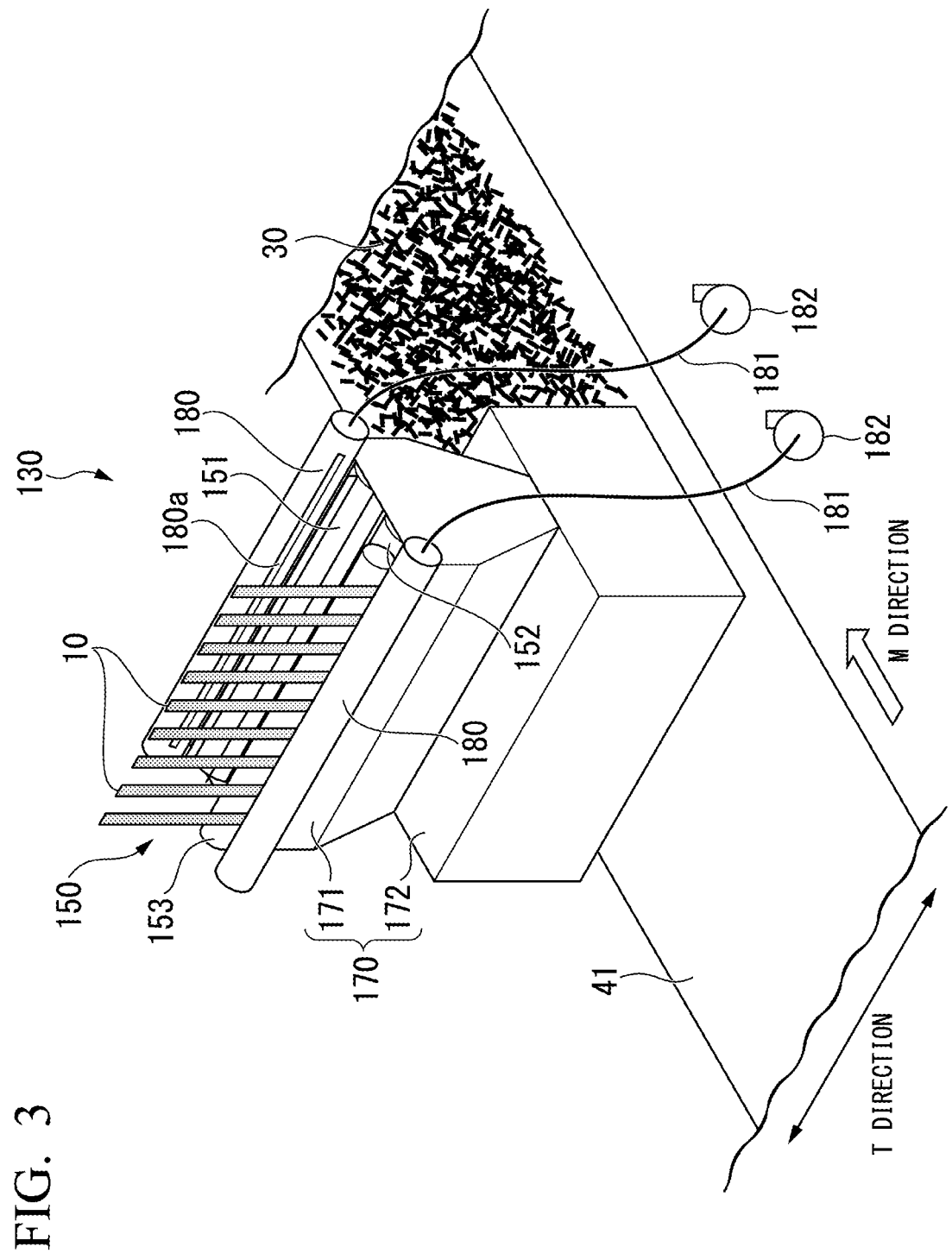
FIG. 3 is a schematic diagram of a fiber mat deposition apparatus.

As shown in FIG. 2 and FIG. 3, the fiber mat deposition apparatus 130 is disposed above a conveyance path of the first carrier film 41 and has a chopping part 150, a dispersing part 160, an enclosure 170, and a suction nozzle 180.

Below the fiber mat deposition apparatus 130, the surface of the first carrier film 41 conveyed is held horizontal. This is to prevent fallen short carbon fiber bundles 20 and a deposited fiber mat 30 from moving on the surface of the first carrier film 41 due to gravity.

In the chopping part 150, a chopper of the type that has been conventionally used in SMC manufacturing apparatuses, that is, a chopper comprising a cutter roll 151, a receiving roll (rubber roll) 152, and a guide roll 153, each of which has a rotation axis parallel to the T direction, is used.

During the manufacture of a CF-SMC, a continuous carbon fiber bundle 10 supplied to the fiber mat deposition apparatus 130 is cut in the chopping part 150.

The chopping part 150 may be configured to cut the continuous carbon fiber bundle 10 such that the longitudinal direction of the continuous carbon fiber bundle 10 and the cut surface form an angle of 80° or less, 45° or less, or 30° or less.

In the fiber mat deposition apparatus 130, the chopping part 150 is disposed on the inside of the enclosure 170.

An electric motor and a power transmission system (not shown in the figure) for rotationally driving the cutter roll 151 and the receiving roll 152 are preferably disposed outside the enclosure 170 in order to avoid contamination by fiber dust.

When the cutter roll 151 and the receiving roll 152 are connected to the power transmission system on the outside of the enclosure 170, an opening is provided in the enclosure 170 in order for at least one end of a shaft included in each of those rolls to protrude out of the enclosure 170. It is desirable that the size of the opening is set to the minimum necessary, in order to prevent fiber dust from leaking out of the enclosure 170 through the opening.

Preventing fiber dust from leaking out of the enclosure 170 is beneficial in terms of improving the work environment in the room in which the SMC manufacturing apparatus 100 is installed, in addition to preventing contamination of the mechanical elements disposed outside the enclosure 170.

In the dispersing part 160, a pair of pin rolls disposed side by side, that is, a first pin roll 161 and a second pin roll 162, are used as the dispersing rolls. The dispersing part 160 is disposed below the chopping part 150, and during the manufacture of a CF-SMC, the short carbon fiber bundles 20 falling from the chopping part 150 are dispersed by the dispersing part 160.

Both the first pin roll 161 and the second pin roll 162 have a rotation axis parallel to the T direction, and both are rotationally driven by a drive mechanism (not shown in the figure).

The speeds of rotation of the first pin roll 161 and the second pin roll 162 may be independently controllable.

Figure 4:
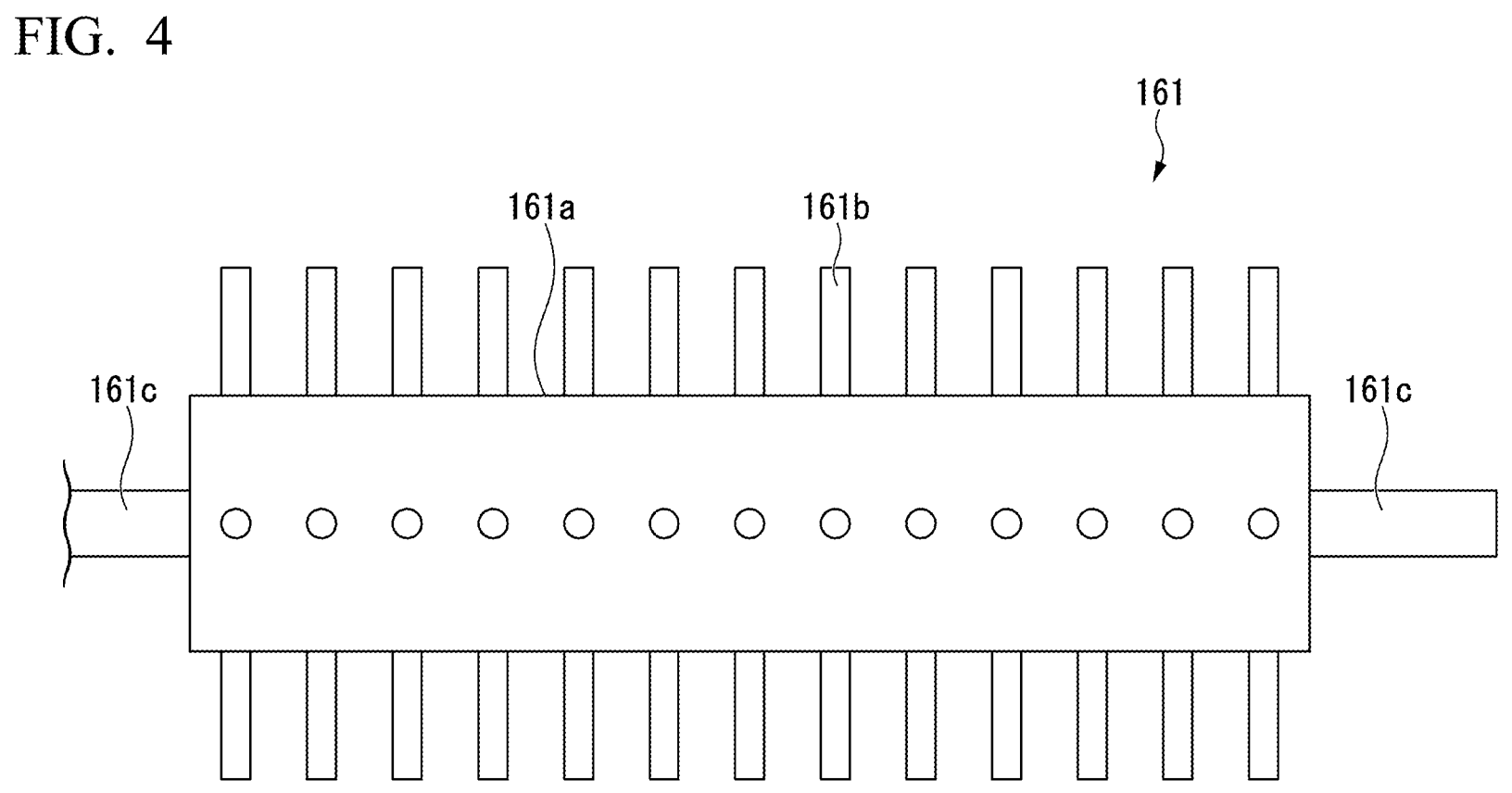

As shown in FIG. 4, the first pin roll 161 has a cylinder 161a, a plurality of pins 161b disposed on the circumferential surface of the cylinder 161a, and a shaft 161c that penetrates the center of the cylinder 161a in the direction of the rotation axis. It is preferable that all of the plurality of pins 161b have the same shape and dimensions as each other.

Both the cylinder 161a and the pin 161b are rigid bodies and are formed of, for example, a metal.

The diameter of the cylinder 161a is not limited; however, the diameter may be, for example, 60 mm to 150 mm. As the diameter of the cylinder 161a is larger, the entirety of the pins 161b moves at a higher circumferential speed when the first pin roll 161 is rotated, and therefore, the ability to disperse the short carbon fiber bundles increases.

The pins 161b extend perpendicularly to the rotation axis of the first pin roll 161, and although not limited thereto, the pins 161b have, for example, a columnar shape. The boundary between an end surface and the circumferential surface of the pin 161b may be chamfered.

The diameter of the pin 161b is not limited, but may be, for example, 1 mm to 5 mm.

The length of the pin 161b, that is, the distance from the tip to the base of the pin is not limited, but may be, for example, 10 mm to 50 mm.

It is preferable that the disposition of the pins 161b on the circumferential surface of the cylinder 161a is periodic in each of the axial direction and the circumferential direction.

The period of disposition of the pins 161b on the circumferential surface of the cylinder 161a may be, for example, 5 mm or more and less than 20 mm, 20 mm or more and less than 40 mm, or 40 mm or more and less than 60 mm, in the axial direction.

In the example of FIG. 4, the disposition of the pins 161b on the circumferential surface of the cylinder 161a has a period of 90° in the circumferential direction; however, a period other than 90° including, for example, 5°, 10°, 15°, 20°, 24°, 30°, 45°, 60°, 72°, 120°, or 180° can also be employed.

In the present specification, the maximum radius of the pin roll is defined as a distance from the rotation axis of the pin roll to the tip of the longest pin. In the first pin roll 161, the radius of the cylinder 161a is preferably half or more and more preferably 75% or more of the maximum radius of the first pin roll 161. This is because as the ratio of the cylinder radius to the maximum radius of the pin roll is higher, the difference between the circumferential speed at the tip of the pin and the circumferential speed at the base of the pin is smaller when the pin roll is rotating.

All of the above description with regard to the first pin roll 161 also applies to the second pin roll 162.

Without imposing any limitation, in order to reduce the cost of designing, manufacturing, and maintaining the fiber mat deposition apparatus 130, it is preferable to match the design and specifications of the first pin roll 161 and the second pin roll 162 in as many items as possible, including the axial direction length, the maximum radius, the cylinder diameter, the shape, dimensions, number, and disposition of the pins, and the materials of the cylinder and the pins.

Figure 5:
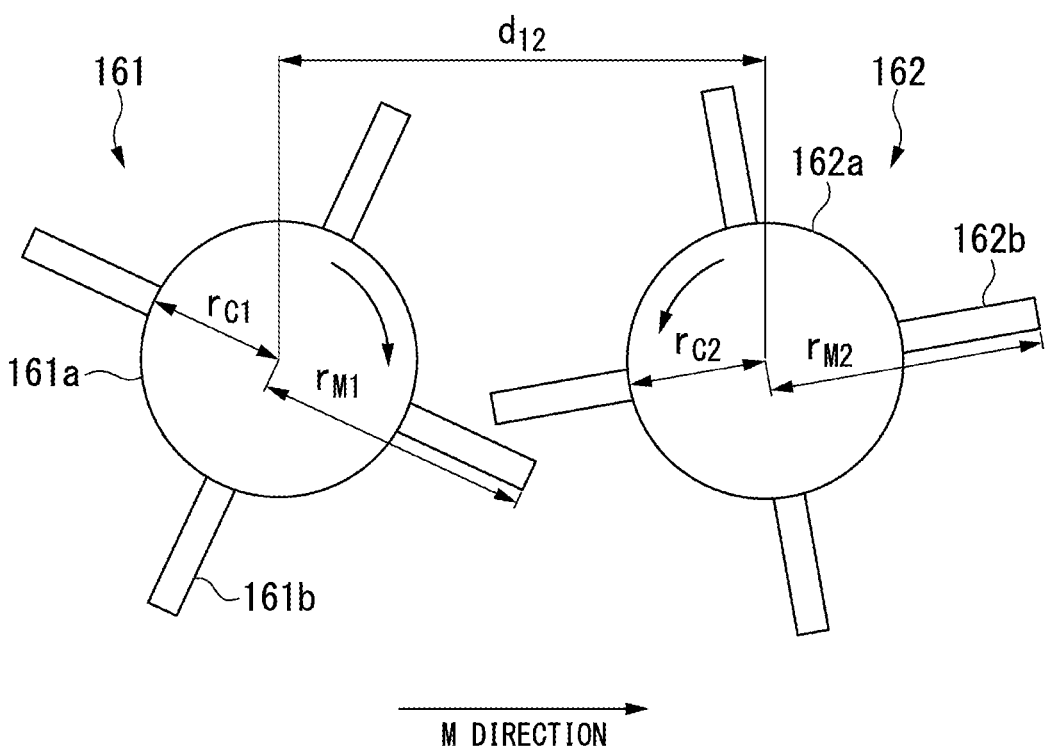
FIG. 5 is a schematic diagram showing a positional relationship between two pin rolls in a disperser.

In order for more short carbon fiber bundles 20 to be hit by the pins of the first pin roll 161 and the second pin roll 162 when passing between these pin rolls, it is preferable that the sum of the maximum radius $r_{M1}$ of the first pin roll 161 and the maximum radius $r_{M2}$ of the second pin roll 162 is larger than the distance $d_{12}$ between the rotation axes of these two pin rolls, as shown in FIG. 5.

The sum of the maximum radius $r_{M1}$ of the first pin roll 161 and the cylinder radius $r_{C2}$ of the second pin roll 162 and the sum of the cylinder radius $r_{C1}$ of the first pin roll 161 and the maximum radius $r_{M2}$ of the second pin roll 162 are both smaller than the distance $d_{12}$ between the rotation axes of the two pin rolls.

In an example, the sum of the maximum radius $r_{M1}$ of the first pin roll 161 and the maximum radius $r_{M2}$ of the second pin roll 162 in the fiber mat deposition apparatus 130 may be equal to the distance $d_{12}$ between the rotation axes of these two pin rolls.

In another example, the sum of the maximum radius $r_{M1}$ of the first pin roll 161 and the maximum radius $r_{M2}$ of the second pin roll 162 in the fiber mat deposition apparatus 130 may be slightly smaller than the distance $d_{12}$ between the rotation axes of these two pin rolls. The difference $\{d_{12} - (r_{M1} + r_{M2})\}$ is preferably 10 mm or less, and more preferably 5 mm or less.

In the fiber mat deposition apparatus 130, the dispersing part 160 is disposed on the inside of the enclosure 170.

An electric motor and a power transmission system (not shown in the figure) for rotationally driving the first pin roll 161 and the second pin roll 162 are preferably disposed outside the enclosure 170 in order to avoid contamination by fiber dust.

When the first pin roll 161 and the second pin roll 162 are connected to the power transmission system on the outside of the enclosure 170, an opening is provided in the enclosure 170 in order for at least one end of each of the shafts 161c and 162c to protrude out of the enclosure 170. It is desirable that the size of the opening is set to the minimum necessary, in order to prevent fiber dust from leaking out of the enclosure 170 through the opening.

Preventing fiber dust from leaking out of the enclosure 170 is beneficial in terms of improving the work environment in the room in which the SMC manufacturing apparatus is installed, in addition to preventing contamination of the mechanical elements disposed outside the enclosure 170.

Figure 14:
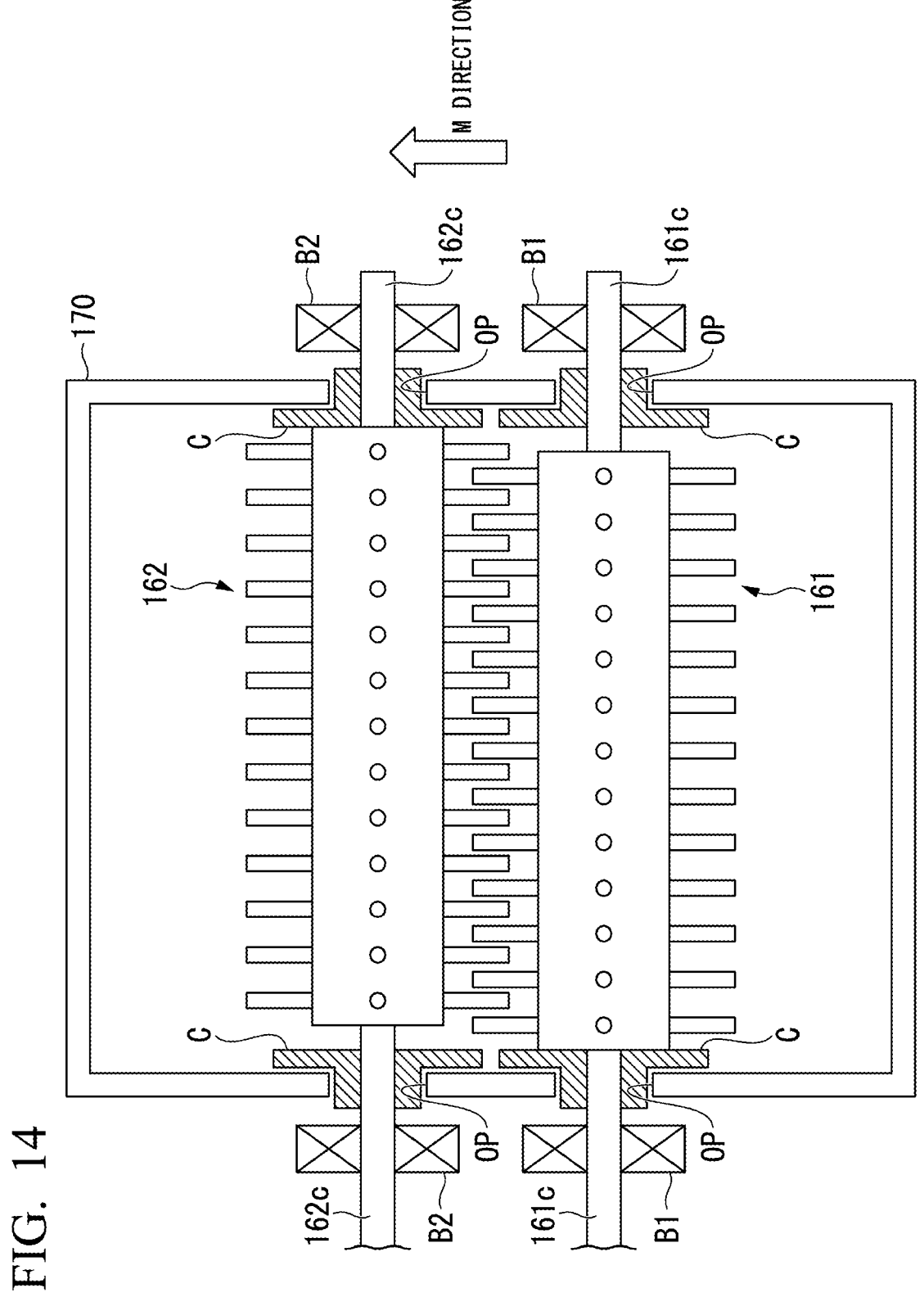
FIG. 14 is a schematic diagram showing a part of a fiber mat deposition apparatus.

In an example, as shown in FIG. 14, two bearings B1 supporting the shaft 161c of the first pin roll and two bearings B2 supporting the shaft 162c of the second pin roll may be disposed outside the enclosure 170 in order to avoid contamination by fiber dust. In this case, the enclosure 170 is provided with an opening OP necessary for this purpose. It is desirable that the size of the opening is set to the minimum necessary, in order to prevent fiber dust from leaking out of the enclosure 170 through the opening.

In the example of FIG. 14, in order to more effectively prevent fiber dust from leaking out of the enclosure 170 through the opening OP, each of both the first pin roll 161 and the second pin roll 162 is provided with two collars C. Each opening OP is preferably circular, and each collar C is preferably disk-shaped.

Each collar C is adjacent to the opening OP on the inside of the enclosure 170. On a plane perpendicular to the T direction, the orthographic projection of the opening OP falls inside the outline of the orthographic projection of the collar C adjacent to the opening OP.

Figure 15:
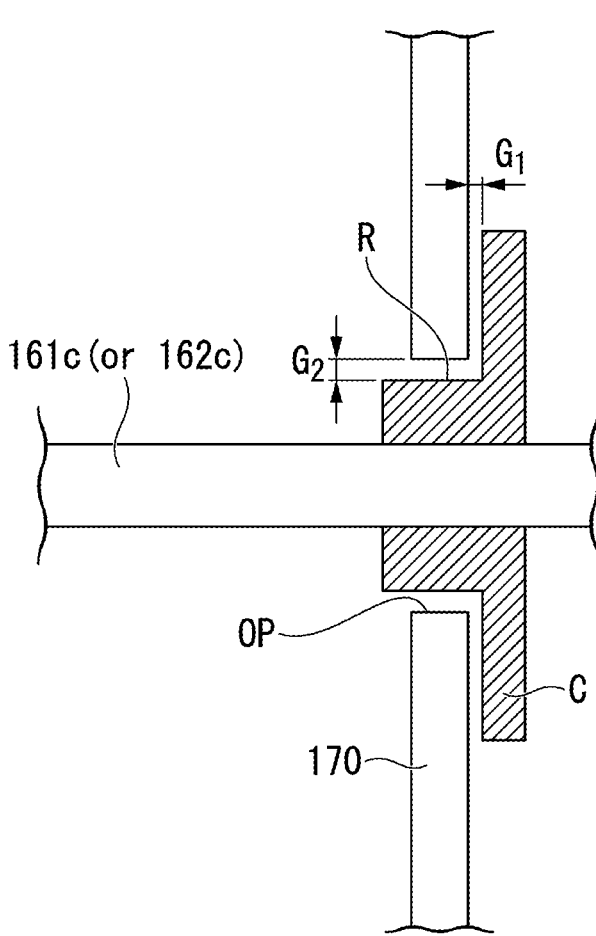
FIG. 15 is a schematic diagram showing a part of a fiber mat deposition apparatus.

Referring to FIG. 15, a gap $G_1$ between the collar C and the enclosure 170 can be set to, for example, 5 mm or less, 3 mm or less, or 1 mm or less, and as the gap $G_1$ is narrower, it is more preferable for preventing fiber dust from leaking out of the enclosure 170.

As shown in FIG. 14 and FIG. 15, a cylindrical ring R integrated with the collar C may be inserted into the opening OP provided in the enclosure 170. A gap $G_2$ between the cylindrical ring R and the opening OP can be set to, for example, 5 mm or less, 3 mm or less, or 1 mm or less, and as the gap $G_2$ is narrower, it is more preferable for preventing fiber dust from leaking out of the enclosure 170.

It is preferable, but not necessary, to use the collar C.

The number of dispersing rolls used in the dispersing part is not limited to two. In an example, the number of dispersing rolls used in the dispersing part may be 1 or may be 3 or more.

In an example, in addition to the pin roll or in place of the pin roll, a dispersing roll of a type other than the pin roll can be used in the dispersing part.

The dispersing roll needs an element, such as a pin in a pin roll, that moves in a circumferential direction and hits the short carbon fiber bundles 20 when the dispersing roll is rotated. In order to satisfy this requirement, the dispersing roll may have n-fold rotational symmetry (provided that n is an integer of 1 or more, is finite, and is preferably 72 or less) about the rotation axis thereof n may be 45 or less, 36 or less, or 24 or less.

For example, the first pin roll 161 shown in FIG. 4 has 4-fold rotational symmetry about the rotation axis.

Figure 6:
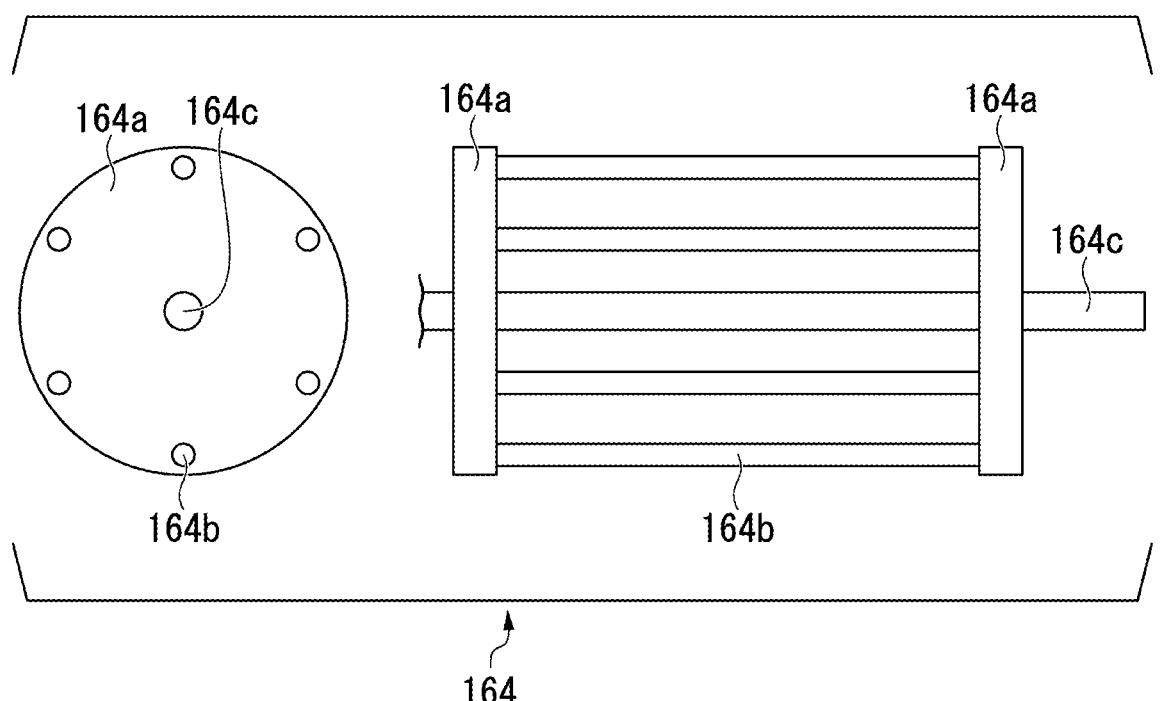
FIG. 6 is a schematic diagram of a cage roll.

A cage roll 164 shown in FIG. 6 is an example of a dispersing roll of a type other than the pin roll. The cage roll 164 has a structure in which a plurality of rods 164b are spanned between a pair of disks 164a sharing a rotation axis, and a shaft 164c penetrates through the center of each disk 164a.

In the example shown in FIG. 6, since six rods 164b are arranged at equal intervals in the circumferential direction on a cylindrical surface centered about the rotation axis, the cage roll 164 has 6-fold rotational symmetry about the rotation axis thereof. The material of the rods 164c is preferably, but not limited to, a metal. When the cage roll 164 is rotated, the rods 164c move in the circumferential direction and hit the short carbon fiber bundles 20.

In a modified example, the rod 164c of the cage roll 164 may be replaced with a bar having a non-circular cross-section, such as a square bar or a flat bar, or may be replaced with a taut wire.

In the cage roll according to an example, a plurality of rods may be disposed at equal intervals in the circumferential direction on each of several concentric cylindrical surfaces centered about the rotation axis. The number of rods disposed on each cylindrical surface is not particularly limited, but may be, for example, 3 to 8.

The cage roll according to an example may have a structure in which a plurality of structural units each comprising a plurality of rods spanned between a pair of disks sharing the rotation axis are lined up in the length direction of the shaft. In this case, one disk may be shared between the structural units that are adjacent to each other.

Referring to FIG. 2 and FIG. 3 again, the enclosure 170 comprises an upper part 171 constituting a shooter for guiding the short carbon fiber bundles 20 from the chopping part 150 to the dispersing part 160, and a lower part 172 constituting a housing of a fiber sprinkling booth including the dispersing part 160 on the inside.

The enclosure 170 is formed using plates made of a metal or a resin and is not breathable. The enclosure 170 is usually created using a plurality of plates. It is not necessary for all parts of the enclosure 170 to be formed of plates of the same material.

Figure 17:
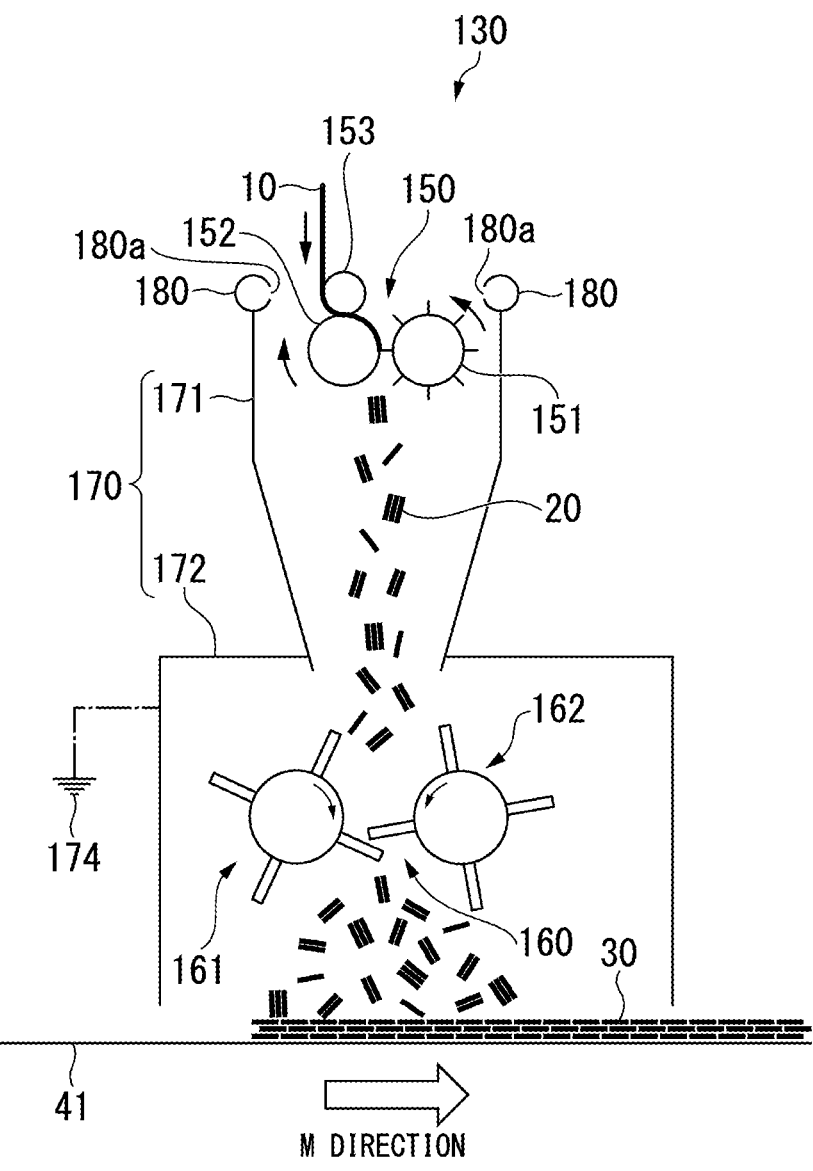
FIG. 17 is a schematic diagram of a fiber mat deposition apparatus.

When fiber dust adheres to the surface of the enclosure 170 due to the action of static electricity, this may trigger the formation of lint. In order to prevent this, for example, the enclosure 170 is preferably formed with metal plates 170 and further grounded as shown in the example of FIG. 17. In the example of FIG. 17, a grounding cable extends from the lower part 172 of the enclosure 170 to a grounding point 174; however, in an example, the grounding cable may extend from the upper part 171 of the enclosure 170. The mode of grounding is not limited to these examples. Preferred examples of the material of the metal plates include an aluminum alloy and stainless steel, and the aluminum alloy is more preferable in view of high electrical conductivity.

When the inner surface of the enclosure 170 is scratched, lint may be formed as a result of fiber dust getting caught on the scratches. An aluminum alloy plate is easily scratched and thus may be subjected to electroless nickel plating before use in order to increase surface hardness.

The upper part 171 and the lower part 172 of the enclosure are connected without a gap, and at the connection between these no air flows from the inside to the outside of the enclosure 170.

As a result, fiber dust generated from the short carbon fiber bundles that have come into contact with the first pin roll 161 or the second pin roll 162 rises while floating inside the enclosure 170 on an air current generated by these dispersing rolls to reach the height of the upper end of the enclosure 170.

The configuration of the enclosure 170 is not limited to that shown in FIG. 2 and FIG. 3. As in the example shown in FIG. 7, the enclosure 170 may have the same horizontal cross-sectional shape from the upper end to the lower end.

The SMC manufacturing apparatus 100 may have a frame for fixing the chopper, the dispersing roll, and the like, and the frame may form a part of the enclosure 170.

As shown in FIG. 2, the enclosure 170 is continuous between a first height $H_1$ (defined below) and a second height $H_2$ (defined below).

The first height $H_1$ is the height of the rotation axis of each of the cutter roll and the receiving roll of the chopper used in the chopping part 150, and when the heights of these rotation axes are different, the first height $H_1$ refers to the height of the one located at a higher position.

The second height $H_2$ refers to the height of the rotation axis of the dispersing roll having the rotation axis at the lowest position among the dispersing rolls used in the dispersing part 160.

In a preferred example, the position of the upper end of the enclosure 170 may be higher than the first height $H_1$.

In a preferred example, the position of the lower end of the enclosure 170 may be lower than the second height $H_2$, and may be even lower than a third height $H_3$ that is defined below.

The third height $H_3$ refers to a lowest point height of the dispersing roll of which lowest point height is the lowest among the dispersing rolls used in the dispersing part. The lowest point height refers to the height obtained by subtracting the maximum radius of the dispersing roll from the height of the rotation axis of the dispersing roll. The maximum radius of a dispersing roll is defined as the radius of a cylinder that has the rotation axis of the dispersing roll as the central axis and circumscribes the dispersing roll. Therefore, in the case of a pin roll, the distance from the rotation axis to the tip of the longest pin is the maximum radius, and in the case of a cage roll, the radius of a pair of disks provided for spanning rods or wires is the maximum radius.

It is noted that while in FIG. 3, the first height $H_1$, the second height $H_2$, and the third height $H_3$ are expressed with respect to the surface of the first carrier film 41 as a reference for convenience only, the reference of height does not necessarily have to be the surface of the first carrier film 41.

When "front and rear" is defined by identifying a direction running from the rear to the front as the M direction, in the example shown in FIG. 2 and FIG. 3, a suction nozzle 180 having a suction opening-forming part 180a is mounted at each of the front part and the rear part at the upper end of the enclosure 170. The same applies to the example shown in FIG. 7.

Each of the two suction nozzles 180 has the suction opening-forming parts 180a with a longitudinal direction and is arranged such that the longitudinal direction is parallel to the T direction. The direction of the suction opening-forming part 180a is set such that the fiber dust rising inside the enclosure 170 can be suctioned.

Figure 8:
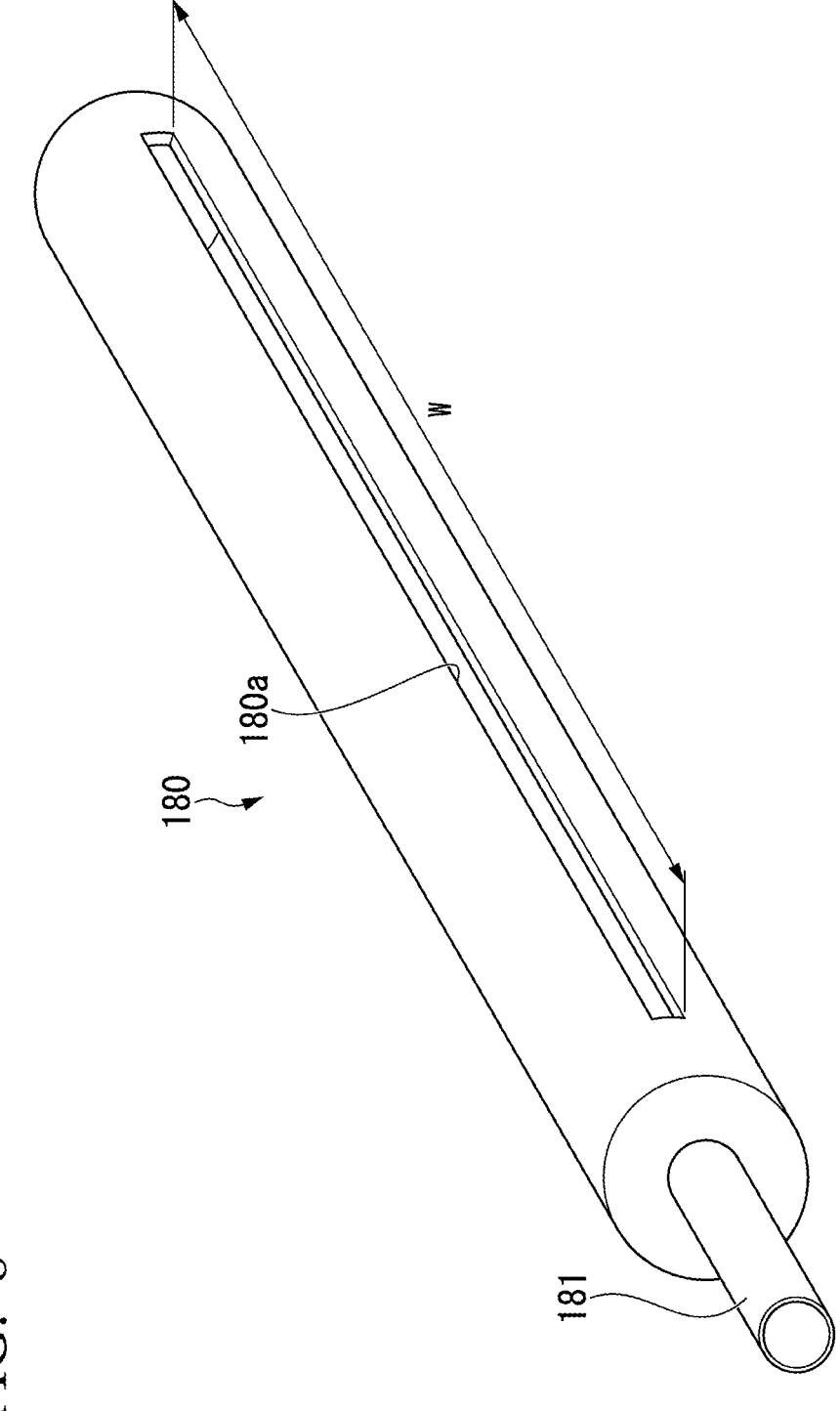
FIG. 8 is a schematic diagram of a suction nozzle.

As shown in FIG. 8, the main body of the suction nozzle 180 is a cylinder with both ends closed, and the suction opening-forming part 180a is provided on a side face thereof.

While the suction nozzle 180 has a connection part with a hose 181 at one end in the longitudinal direction, FIG. 8 is only an example, and there is no limitation in the position and the number of the connection part to the hose in the suction nozzle 180.

Figure 9:
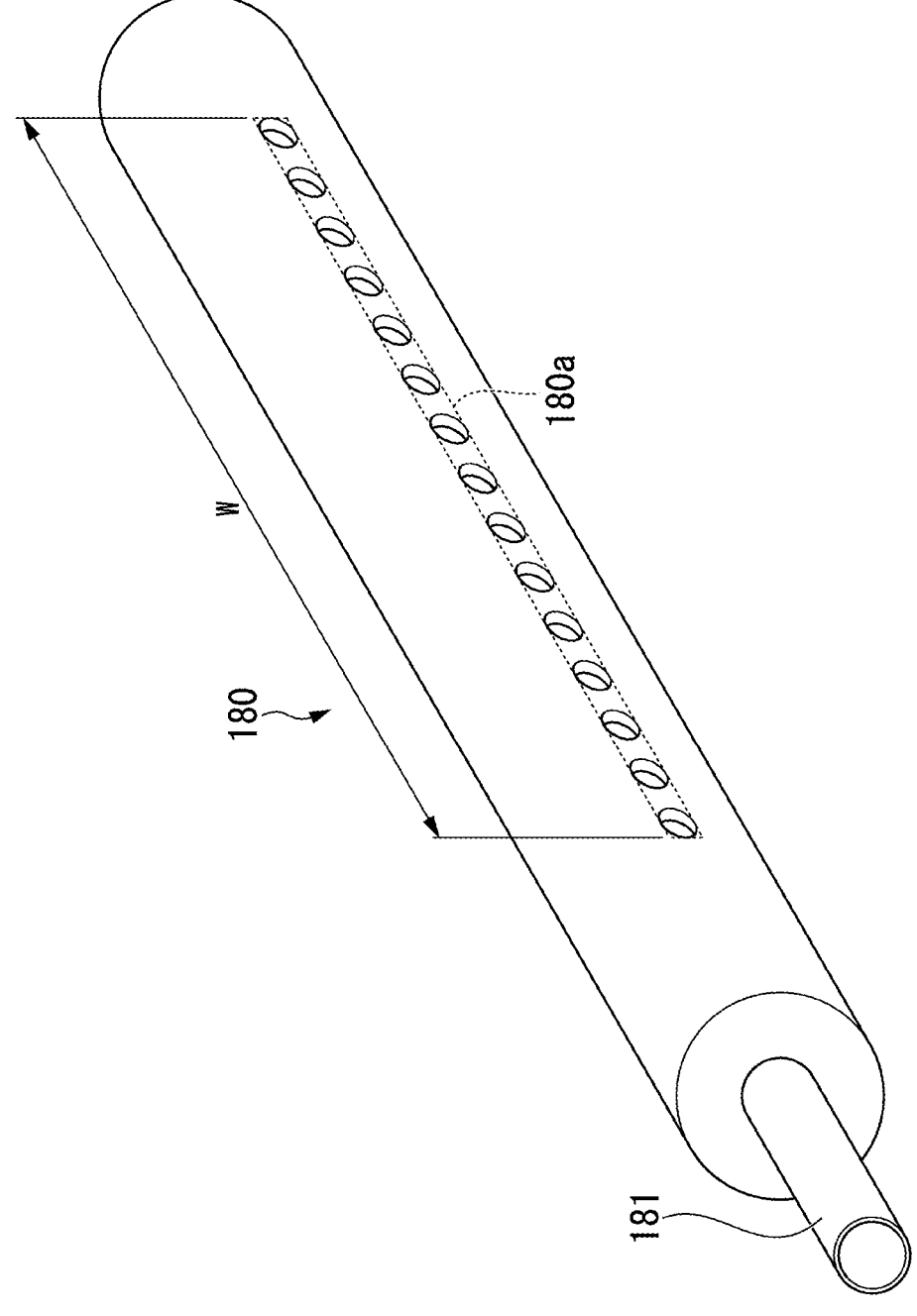
FIG. 9 is a schematic diagram of a suction nozzle.

The suction opening formed in the suction opening-forming part 180a is preferably a slit type as shown in the example shown in FIG. 8 but is not limited thereto. For example, as shown in FIG. 9, a plurality of suction openings may be lined up in the suction opening-forming part 180a.

Figure 10:
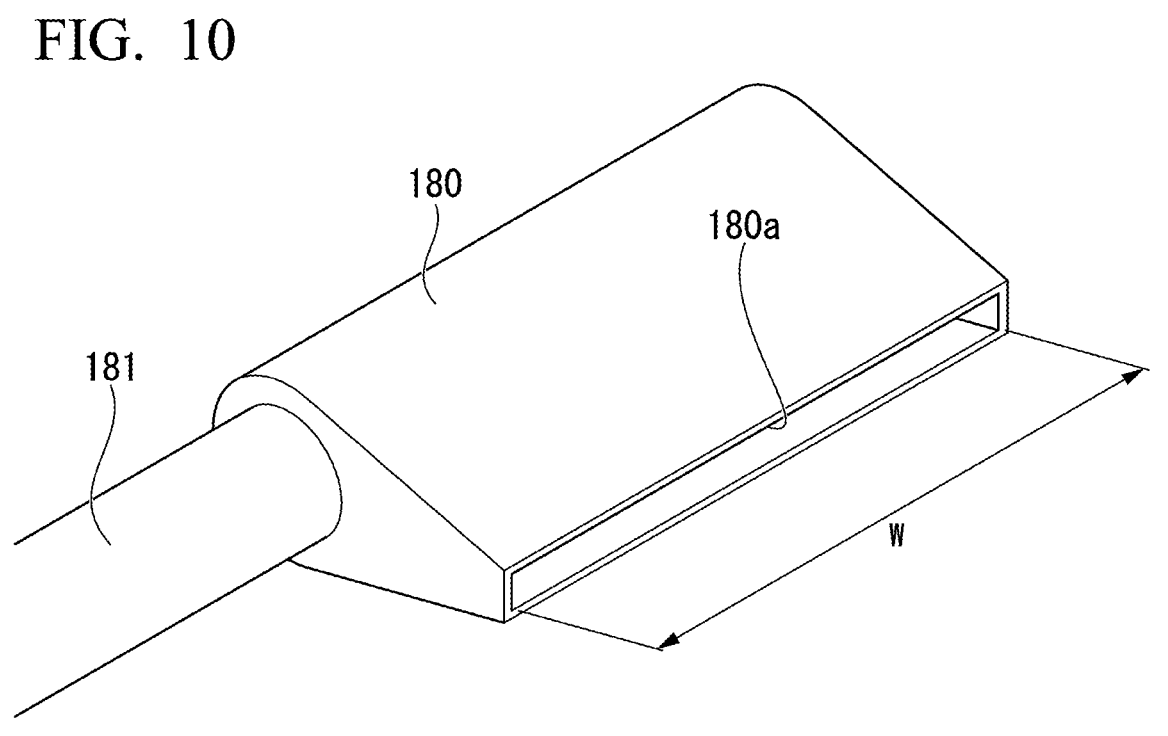

The shape of the main body of the suction nozzle 180 is not limited and may be a shape other than a cylinder, as is the case of the example shown in FIG. 10.

Figure 7:
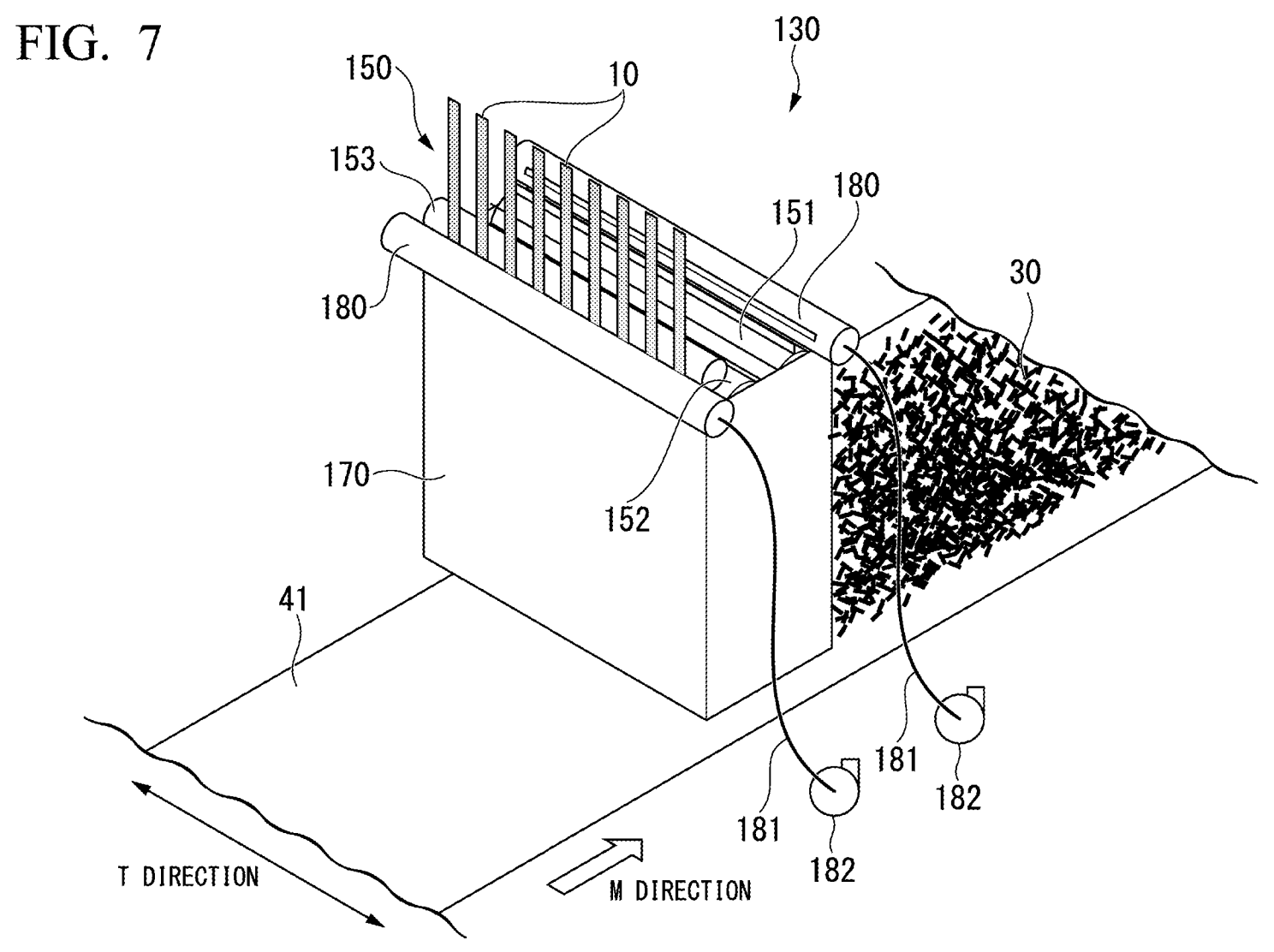

As shown in FIG. 3 and FIG. 7, the suction nozzle 180 is connected to a dust collector 182 by the hose 181. It is preferable that the dust collector 182 is a dust collector comprising a separator that separates dust from air utilizing centrifugal force, that is, a cyclone dust collector.

The dust collector 182 is operated during the manufacture of a CF-SMC, and at least a portion of the fiber dust that has risen while floating inside the enclosure 170 to reach the height of the upper end thereof is removed by suction through the suction nozzle 180 before going out of the fiber mat deposition apparatus 130.

In order that as much fiber dust as possible is removed, the width W of the suction opening-forming part 180a of the suction nozzle 180 is preferably 50% or more, more preferably 75% or more, and even more preferably 90% or more, and may be even 100% or more of the inner dimension in the T direction of the enclosure 170.

In an example, the suction nozzle 180 may be disposed on the inside of the enclosure 170, in addition to or in place of the upper end of the enclosure 170.

Figure 11:
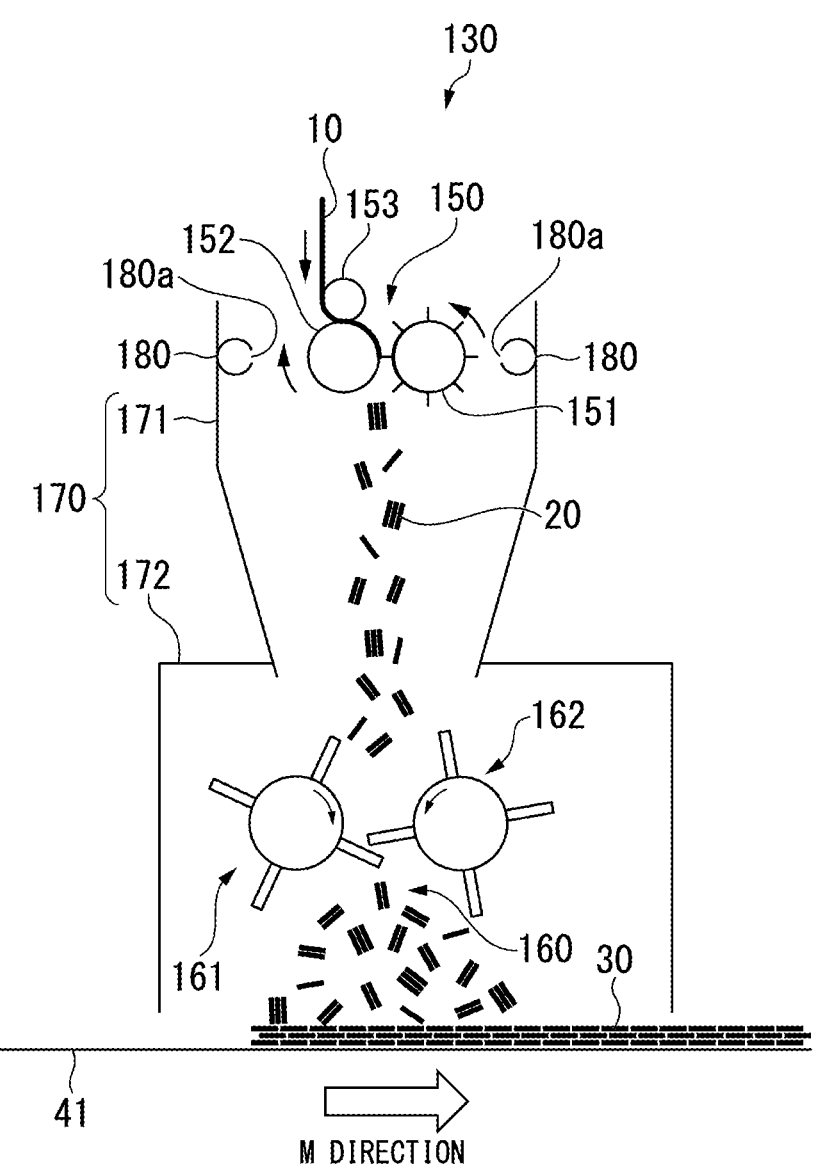
FIG. 11 is a schematic diagram of a fiber mat deposition apparatus.

An example of preferable disposition of the suction nozzles 180 is a disposition in which the suction opening-forming parts 180a face the cutter roll 151 or the receiving roll 152 in the chopping part 150, as is the case of the example of FIG. 11.

By disposing the suction nozzles 180 in this way, fiber dust can be removed effectively with a small air suction volume when a rising air current including the fiber dust passes through narrow spaces between the enclosure 170 and the cutter roll 151 and between the enclosure 170 and the receiving roll 152.

In an example, at least one suction nozzle 180 may be disposed on the inside of the lower part 172 of the enclosure 170.

Instead of disposing the suction nozzle on the inside of the enclosure 170, the enclosure 170 may be provided with an air outlet, which is connected to the dust collector with a hose.

The path of the air current generated inside the enclosure 170 during the manufacture of a CF-SMC may change depending on the design and the operating conditions of the fiber mat deposition apparatus 130. Thus, it is also acceptable that after finding a place where the frequency of generation of lint is high in the case of manufacturing a CF-SMC without using a dust collector, a suction nozzle is disposed on a path of an air current toward the place. In order to clarify the path, how the amount of lint generated changes at several places according to the placement of suction nozzles may also be examined in the case of manufacturing a CF-SMC while operating a dust collector. As described above, it is possible to optimize the placement of the suction nozzles by trial and error.

Figure 13:
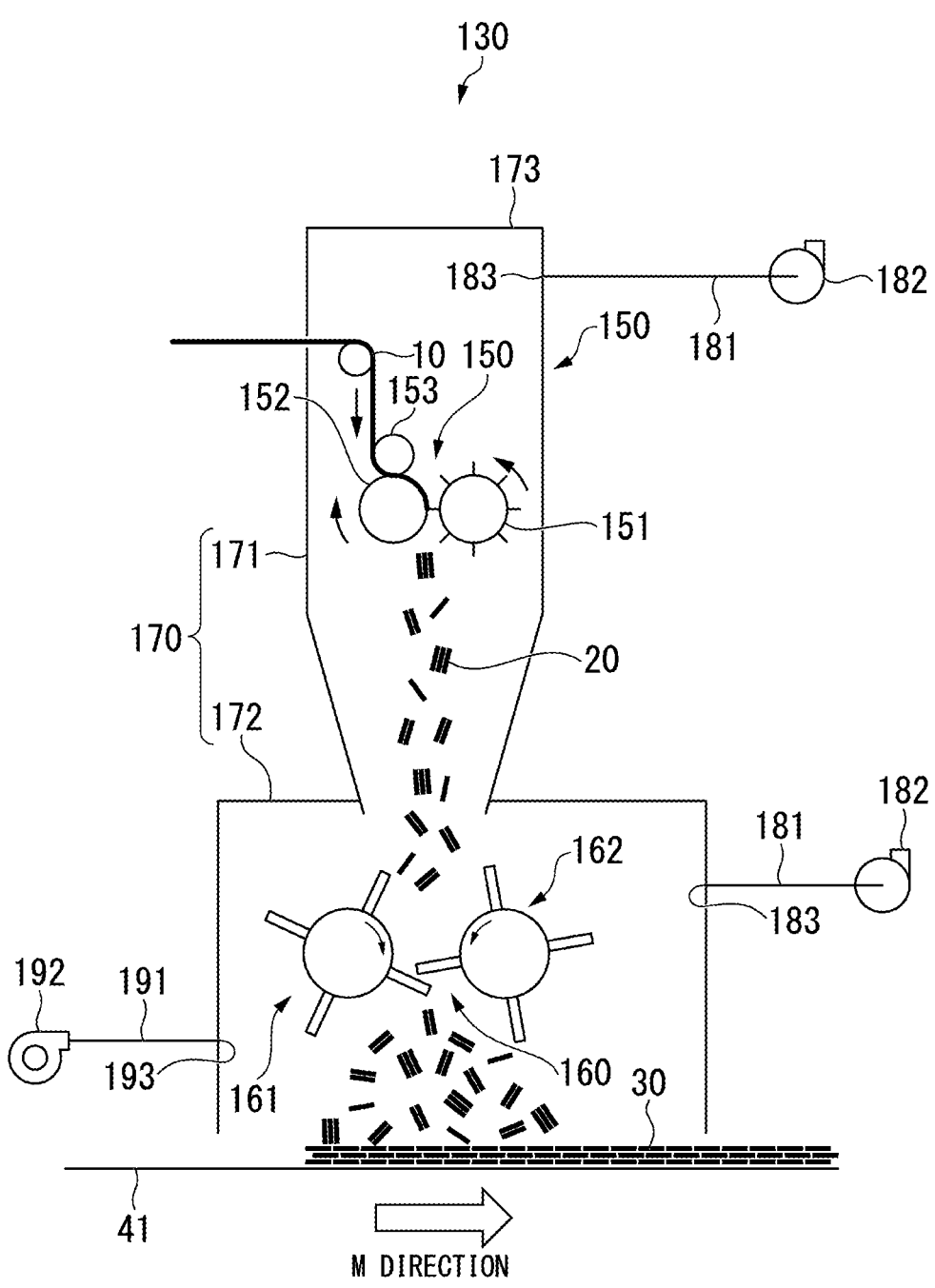
FIG. 13 is a schematic diagram of a fiber mat deposition apparatus.

In an example, in order to effectively prevent fiber dust from leaking out of the enclosure, as shown in FIG. 13, the upper end of the enclosure 170 may be closed with a ceiling board 173. In the example of FIG. 13, instead of disposing the suction nozzle 180 on the inside of the enclosure 170, an air outlet 183 is provided in the enclosure 170, and the air outlet 183 is connected to the dust collector 182 by the hose 181. Placement of the air outlet 183 can be optimized by trial and error, as is the case of the suction nozzle.

In the example shown in FIG. 13, in addition to or in place of providing the enclosure with an air outlet connected to a dust collector, a suction nozzle connected to a dust collector may be disposed on the inside of the enclosure 170.

In the example of FIG. 13, not only the air outlet 183 but also an air inlet 193 connected to a blower 192 by a hose 191 are provided in the lower part 172 of the enclosure 170. As floating fiber dust drifts toward the air outlet 183 by the air supplied to the inside of the enclosure 170 through the air inlet 193, removal of the fiber dust is promoted.

Figure 12:
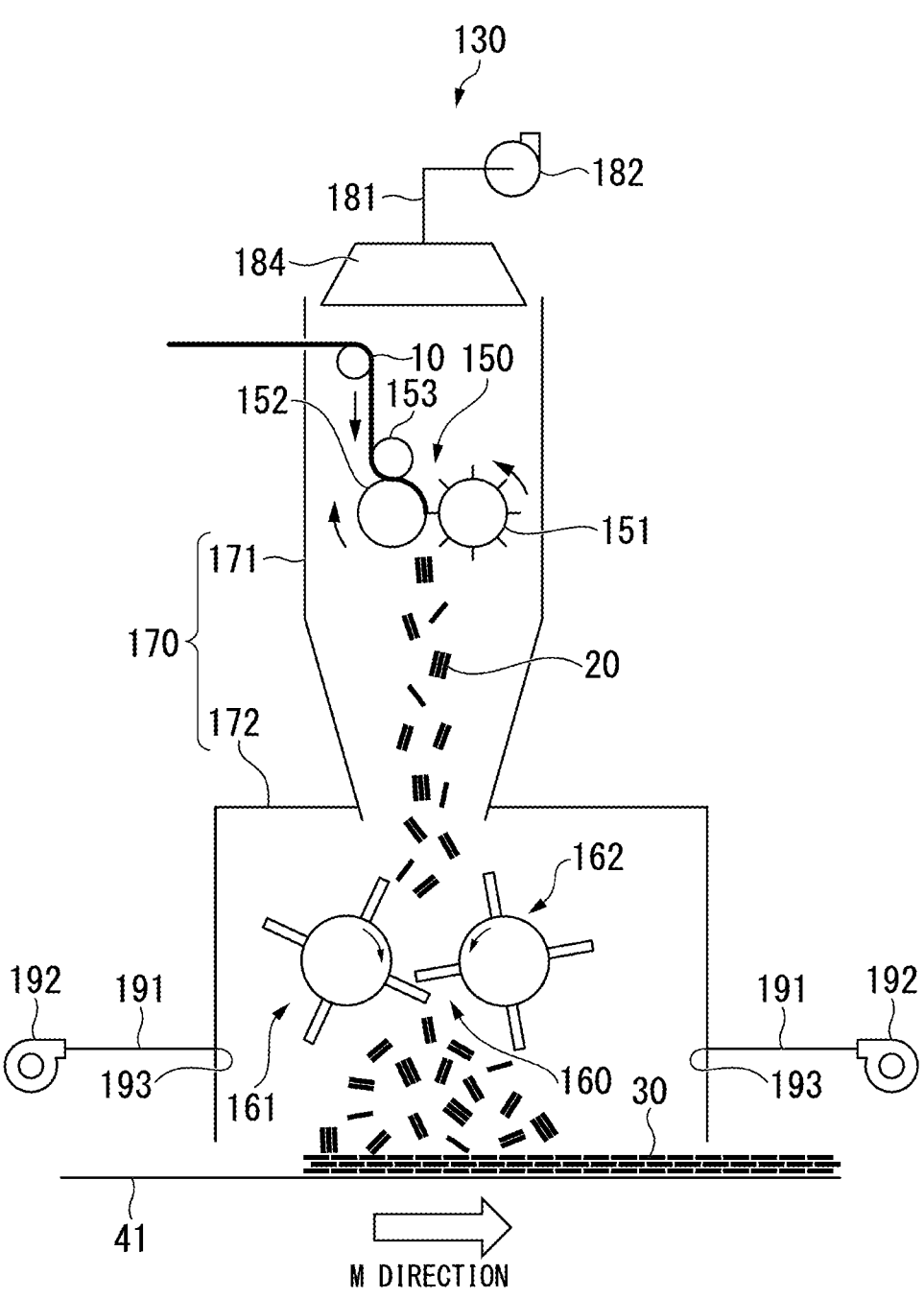
FIG. 12 is a schematic diagram of a fiber mat deposition apparatus.

In another example, in order to prevent fiber dust from leaking out of the enclosure, a suction hood 184 can be disposed above the chopping part 150 as shown in FIG. 12. The suction hood 184 is connected to the dust collector 182 by, for example, the hose 181.

In the example of FIG. 12, there is a gap between the enclosure 170 and the suction hood 184; however, in an example, this gap can be eliminated.

In the example of FIG. 12 as well, the enclosure 170 is provided with the air inlet 193 connected to the blower 192 by the hose 191 for the purpose of promoting the removal of fiber dust.

In the example shown in FIG. 12, in addition to the use of a suction hood, a suction nozzle connected to a dust collector may be disposed on the inside of the enclosure 170, or an air outlet connected to a dust collector may be provided in the enclosure 170.

Figure 16:
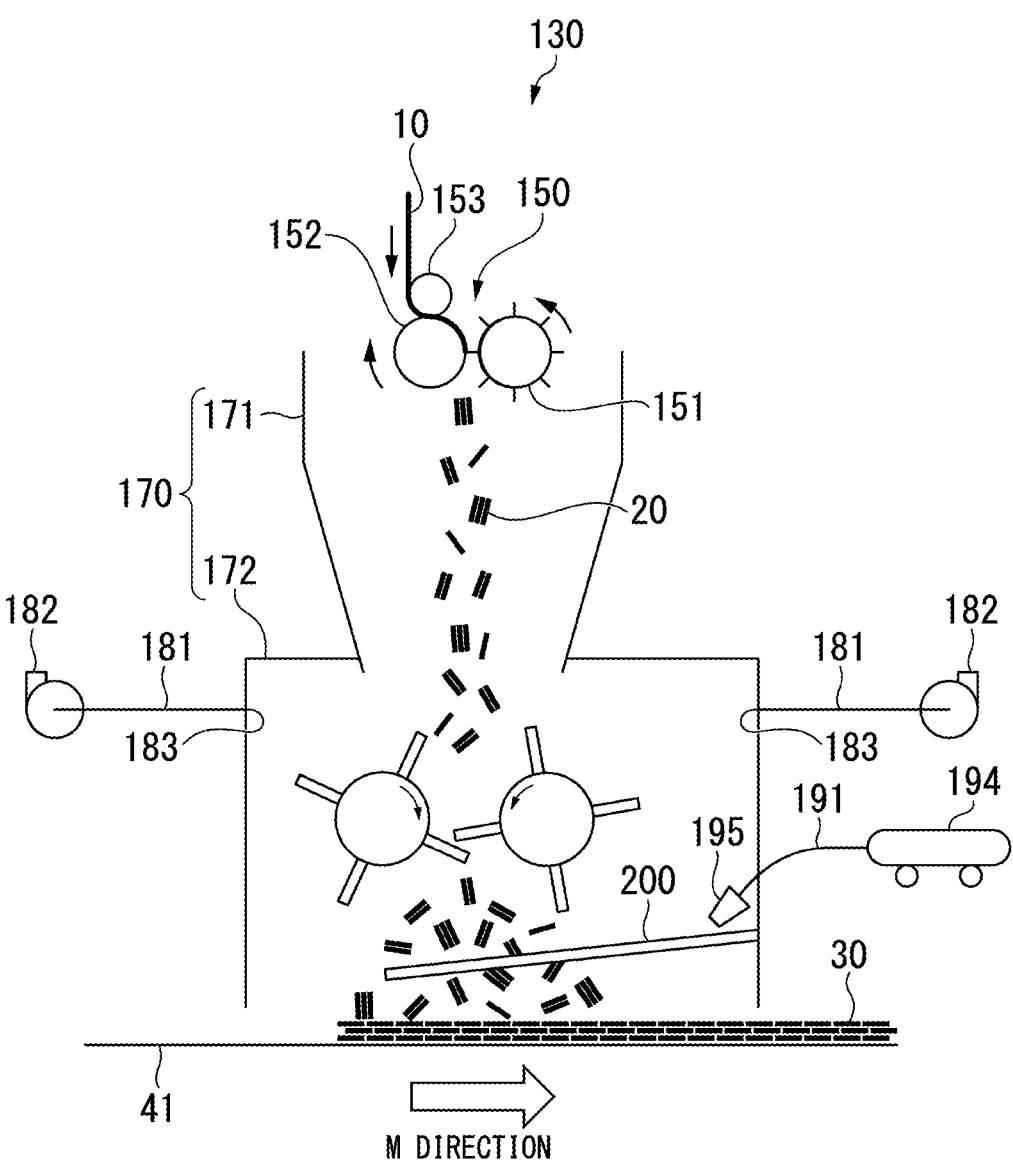
FIG. 16 is a schematic diagram of a fiber mat deposition apparatus.

In the example shown in FIG. 16, a rod group 200 comprising a plurality of rods arranged in parallel at an interval slightly larger than the fiber length of the short carbon fiber bundles 20 is installed below the dispersing part 160. Each rod extends perpendicularly to the T direction and in a horizontal direction or in a direction inclined from the horizontal preferably by 40° or less. The purpose of the rod group 200 is to suppress the orientation of the short carbon fiber bundles 20 in the carbon fiber mat 30 deposited on the first carrier film 41 from being biased in the M direction.

For the purpose of preventing fiber dust from depositing on the rod group 200 to become lint, an air supply nozzle 195 connected to an air compressor 194 is installed on the inside of the enclosure 170. In order to blow off the fiber dust drifted onto the rod group 200, the discharge opening (air inlet) of the air supply nozzle 195 is directed toward the upper part of the rod group 200.

Such an air supply nozzle can be installed for preventing fiber dust from deposition not only on the rod group but also on various places inside the enclosure 170. For example, after finding a place where fiber dust is deposited in the case of manufacturing a CF-SMC without an air supply nozzle provided inside the enclosure 170, the air supply nozzle can be disposed with the discharge opening thereof directing toward that place.

In the example shown in FIG. 2, when the amount of fiber dust drifting toward the chopping part 150 is reduced by, for example, disposing a suction nozzle on the inside of the lower part 172 of the enclosure, the upper part 171 of the enclosure 170 may be omitted. Alternatively, in the upper part 171 of the enclosure 170, only a part whose diameter decreases downward, including the connection with the lower part 172, may be left while the rest may be omitted.

Again referring to FIG. 1, the impregnator 140 is of a type that has been conventionally used in SMC manufacturing apparatuses and comprises two belt conveyors for conveying a stack 60 by sandwiching it from above and below between two conveyor belts, and rolls for pressurizing the stack 60 by putting it therebetween together with the two conveyor belts. The stack 60 is formed by bonding together a first carrier film 41 and a second carrier film 42, with the first resin paste layer 51L, the carbon fiber mat 30, and the second resin paste layer 52L sandwiched therebetween, using a laminator 70 provided between the fiber mat deposition apparatus 130 and the impregnator 140.

2. Method of Manufacturing SMC

A description will be given below of a method of manufacturing a CF-SMC of the embodiment using as an example the case where the SMC manufacturing apparatus described in the section 1. is used.

First, a continuous carbon fiber bundle 10 is drawn out from a fiber package prepared in advance. The continuous carbon fiber bundle 10 may be drawn out from a bobbin package on a creel by unwinding from outside or may be drawn out from a package from which a bobbin has been pulled out by unwinding from inside.

A filament number of the continuous carbon fiber bundle 10, that is, the number of carbon fiber filaments constituting the continuous carbon fiber bundle 10, is preferably in the range of 3K to 100K. Since K means 1000, 3K is 3000, and 100K is 100000. The filament number of the continuous carbon fiber bundle 10 may be, for example, 12K, 15K, 20K, 24K, 48K, 50K, or 60K.

The continuous carbon fiber bundle 10 may be partially split into a plurality of sub-bundles in advance.

A plurality of the continuous carbon fiber bundles 10 are aligned to be parallel to each other and are supplied to the fiber mat deposition apparatus 130 from a direction orthogonal to the T direction.

In the chopping part 150 of the fiber mat deposition apparatus 130, the continuous carbon fiber bundle 10 is cut to a predetermined length into short carbon fiber bundles 20. The predetermined length is typically in the range of 10 to 60 mm and may be 0.5 inches (about 1.3 cm), 1 inch (about 2.5 cm), 2 inches (about 5.1 cm), or the like, without being limited thereto.

The short carbon fiber bundles 20 fall toward the dispersing part 160 below the chopping part 150 and are dispersed by the first pin roll 161 and the second pin roll 162 and deposited on a first carrier film traveling below the fiber mat deposition apparatus 130 to form carbon fiber mat 30. The treatment performed in the dispersing part 160 is not intended to defibrate the short carbon fiber bundles 20. In a preferred example, the circumferential speed at the pin tips of the first pin roll 161 and the second pin roll 162 is set such that a fiber bundle having a filament number of less than 0.5 K is not generated as far as possible, or even if generated, the contained amount thereof in the carbon fiber mat 30 is less than 1% by weight.

For example, when the continuous carbon fiber bundle 10 is partially split into a plurality of sub-bundles, and the filament number of each sub-bundle is less than 2 K, the circumferential speed at the pin tips of the first pin roll 161 and the second pin roll 162 may be set such that a fiber bundle having a filament number of less than 0.2 K are not generated as far as possible, or even if generated, the contained amount thereof in the carbon fiber mat 30 is less than 1% by weight.

Rotating both the first pin roll 161 and the second pin roll 162 is advantageous in preventing the short carbon fiber bundles 20 from being jammed between these two pin rolls.

Preferably, as shown in FIG. 2, the first pin roll 161 rotates such that the pins 161b move downward from above on the side facing the second pin roll 162, and the second pin roll 162 rotates such that the pins 162*b* move downward from above on the side facing the first pin roll 161.

When the first pin roll 161 and the second pin roll 162 are each rotated such that the pins move downward from above on the side facing the other pin roll, even when the short carbon fiber bundles 20 have a weight distribution, the carbon fiber mat 30 is less likely to have front and back. The reason for this is that both heavy carbon fiber bundles and light carbon fiber bundles pass through a narrow space between the two pin rolls and fall on the first carrier film 41 simultaneously. In other words, it is because the position where heavy short carbon fiber bundles fall and the position where light short carbon fiber bundles fall are less likely to tend to be shifted along the conveyance direction of the first carrier film.

Another reason for rotating each the first pin roll 161 and the second pin roll 162 such that the pins move downward from above on the side farcing the other pin roll is to avoid applying a strong shear force to the short carbon fiber bundles 20 passing through between these two pin rolls. A strong shear force causes fluffing or deterioration of straightness of the carbon fiber bundle.

In order to achieve this object more effectively, it is preferable that the circumferential speeds at the pin tips are equal between the first pin roll 161 and the second pin roll 162.

Before depositing the carbon fiber mat 30, the first resin paste 51 is applied on one surface of the first carrier film 41 drawn out from a roll using the first applicator 110.

The first resin paste 51 is a thermosetting resin composition, whose base resin is, for example, a vinyl ester resin (also called epoxy acrylate resin), an unsaturated polyester resin, an epoxy resin, a polyimide resin, a maleimide resin, or a phenol resin, without being limited thereto. A mixed resin of a vinyl ester resin and an unsaturated polyester resin may be used as the base resin. A curing agent, a polymerization inhibitor, a thickener, a reactive diluent, a low shrinkage agent, a flame retardant, an antibacterial agent, and the like are blended in the first resin paste 51, as necessary.

The second resin paste 52 having the same formulation as the first resin paste 51 is applied on one surface of the second carrier film 42 using the second applicator 120.

The second carrier film 42 is superposed on the first carrier film 41 carrying the carbon fiber mat 30 on the upper surface, in such a manner that the surface of the second carrier film 42 on which the second resin paste layer 52L is formed faces downward. By pressurizing the stack 60 thus formed with the impregnator 140, the carbon fiber mat 30 is impregnated with the first resin paste 51 and the second resin paste 52 to be a resin-impregnated carbon fiber mat.

The resin-impregnated carbon fiber mat is wound on a bobbin while still being sandwiched between the first carrier film 41 and the second carrier film 42. The resin-impregnated carbon fiber mat wound on the bobbin is thickened as necessary before being shipped as a CF-SMC.

The dust collector 182 is continuously operated throughout the manufacture of the CF-SMC.

At least a portion of fiber dust generated due to the short carbon fiber bundles 20 coming into contact with the first pin roll 161 or the second pin roll 162 rises inside the enclosure 170 and then is removed by suction through the suction nozzle 180.

By thus removing the fiber dust, the amount of lint generated that is harmful when incorporated into the carbon fiber mat 30 is reduced.

3. Summary of Embodiments

Preferable embodiments of the present invention include the following but are not limited thereto.

[Embodiment 1] A method of manufacturing a sheet molding compound, the method comprising: (i) drawing out a carrier film from a roll to travel on a conveyance path such that the surface of the carrier film is horizontal; (ii) cutting a continuous carbon fiber bundle into short carbon fiber bundles with a chopper disposed above the conveyance path; (iii) allowing the short carbon fiber bundles to fall onto the carrier film traveling on the conveyance path while dispersing them using a dispersing roll disposed below the chopper to deposit a carbon fiber mat on the carrier film; (iv) impregnating the carbon fiber mat with a thermosetting resin composition to obtain a resin-impregnated carbon fiber mat; and v) concurrently with the deposition of the carbon fiber mat, removing fiber dust generated from the short carbon fiber bundles due to contact with the dispersing roll using a dust collector.

[Embodiment 2] The method of manufacturing according to Embodiment 1, wherein a first pin roll and a second pin roll, which are arranged side by side and have rotation axes parallel to each other, are used as the dispersing roll.

[Embodiment 3] The method of manufacturing according to Embodiment 2, wherein the first pin roll is rotationally driven such that pins move downward from above on a side facing the second pin roll, and the second pin roll is rotationally driven such that pins move downward from above on a side facing the first pin roll.

[Embodiment 4] The method of manufacturing according to Embodiment 2 or 3, wherein a sum of a maximum radius of the first pin roll and a maximum radius of the second pin roll is larger than a distance between the rotation axes of the first pin roll and the second pin roll.

[Embodiment 5] The method of manufacturing according to any one of Embodiments 2 to 4, wherein in each of the first pin roll and the second pin roll, a radius of a cylinder is equal to or larger than half of a maximum radius.

[Embodiment 6] The method of manufacturing according to any one of Embodiments 2 to 5, wherein a circumferential speed at a pin tip of the first pin roll is equal to a circumferential speed at a pin tip of the second pin roll.

[Embodiment 7] The method of manufacturing according to any one of Embodiments 1 to 6, wherein the contained amount of a carbon fiber bundle having a filament number of 0.5 K or more in the carbon fiber mat is 99% by weight or more.

[Embodiment 8] The method of manufacturing according to any one of Embodiments 1 to 7, wherein before the deposition of the carbon fiber mat on the carrier film, a resin paste comprising the thermosetting resin composition is applied on one surface of the carrier film, and after the deposition of the carbon fiber mat, another carrier film with another resin paste comprising the thermosetting resin composition applied on one surface is superposed on the carrier film to form a stack, further followed by pressurizing the stack for the impregnation.

[Embodiment 9] The method of manufacturing according to any one of Embodiments 1 to 8, wherein the removal includes removing the fiber dust while it is floating.

[Embodiment 10] A method of manufacturing a sheet molding compound using a fiber mat deposition apparatus comprising a chopping part and a dispersing part disposed below the chopping part, the method comprising: (i) drawing out a carrier film from a roll to travel on a conveyance path such that the surface of the carrier film is horizontal; (ii)

cutting a continuous carbon fiber bundle into short carbon fiber bundles in the chopping part of the fiber mat deposition apparatus disposed above the conveyance path; (iii) allowing the short carbon fiber bundles to fall onto the carrier film traveling on the conveyance path while dispersing them in the dispersing part of the fiber mat deposition apparatus using a dispersing roll having a rotation axis parallel to a T direction to deposit a carbon fiber mat on the carrier film; (iv) impregnating the carbon fiber mat with a thermosetting resin composition to obtain a resin-impregnated carbon fiber mat; and (v) concurrently with the deposition of the carbon fiber mat, removing fiber dust generated from the short carbon fiber bundles due to contact with the dispersing roll using one or more dust collectors, which may include a cyclone dust collector.

[Embodiment 11] The method of manufacturing according to Embodiment 10, wherein the dispersing roll is a pin roll or a cage roll.

[Embodiment 12] The method of manufacturing according to Embodiment 10 or 11, wherein the dispersing roll has n-fold rotational symmetry (provided that n is an integer of 1 or more, is finite, and is preferably 72 or less) about the rotation axis thereof.

[Embodiment 13] The method of manufacturing according to any one of Embodiments 10 to 12, wherein the dispersing part of the fiber mat deposition apparatus is disposed on the inside of an enclosure.

[Embodiment 14] The method of manufacturing according to Embodiment 13, wherein at least one end of a shaft of the dispersing roll protrudes to the outside of the enclosure through an opening provided in the enclosure.

[Embodiment 15] The method of manufacturing according to Embodiment 13, wherein each of both ends of a shaft of the dispersing roll protrudes out of the enclosure through an opening provided in the enclosure, and a pair of bearings supporting the shaft are both disposed on the outside of the enclosure.

[Embodiment 16] The method of manufacturing according to Embodiment 14 or 15, wherein the dispersing roll is provided with a collar which is adjacent to the opening on the inside of the enclosure, and on a plane perpendicular to the T direction an orthographic projection of the opening falls inside an outline of an orthographic projection of the collar.

[Embodiment 17] The method of manufacturing according to Embodiment 16, wherein a gap between the collar and the enclosure is 5 mm or less.

[Embodiment 18] The method of manufacturing according to any one of Embodiments 14 to 17, wherein an electric motor and a power transmission system for driving the dispersing roll are arranged on the outside of the enclosure.

[Embodiment 19] The method of manufacturing according to any one of Embodiments 13 to 18, wherein the enclosure is provided such that the chopping part is disposed on the inside of the enclosure.

[Embodiment 20] The method of manufacturing according to any one of Embodiments 13 to 19, wherein a suction nozzle connected to at least any of the one or more dust collectors is disposed at an upper end of the enclosure.

[Embodiment 21] The method of manufacturing according to Embodiment 19, wherein an upper end of the enclosure is closed with a ceiling board.

[Embodiment 22] The method of manufacturing according to Embodiment 19, wherein a suction hood connected to at least any of the one or more dust collectors is disposed above the chopping part.

[Embodiment 23] The method of manufacturing according to Embodiment 22, wherein there is no gap between the suction hood and the enclosure.

[Embodiment 24] The method of manufacturing according to any one of Embodiments 13 to 23, wherein a suction nozzle connected to at least any of the one or more dust collectors is disposed on the inside of the enclosure.

[Embodiment 25] The method of manufacturing according to any one of Embodiments 13 to 24, wherein the enclosure is provided with an air outlet, which is connected to at least any of the one or more dust collectors.

[Embodiment 26] The method of manufacturing according to any one of Embodiments 13 to 25, further comprising supplying air to the inside of the enclosure concurrently with the deposition of the carbon fiber mat.

[Embodiment 27] The method of manufacturing according to Embodiment 26, wherein either one or both of a blower and an air compressor are used to supply the air.

[Embodiment 28] The method of manufacturing according to Embodiment 26, wherein an air inlet connected to a blower or an air compressor is disposed on the inside of the enclosure.

[Embodiment 29] The method of manufacturing according to Embodiment 26 or 28, wherein the enclosure is provided with an air inlet connected to a blower or an air compressor.

[Embodiment 30] The method of manufacturing according to any one of Embodiments 13 to 29, wherein the enclosure is formed of metal plates and is grounded.

[Embodiment 31] The method of manufacturing according to any one of Embodiments 10 to 30, wherein before the deposition of the carbon fiber mat on the carrier film, a resin paste comprising the thermosetting resin composition is applied on one surface of the carrier film, and after the deposition of the carbon fiber mat, another carrier film with another resin paste comprising the thermosetting resin composition applied on one surface is superposed on the carrier film to form a stack, further followed by pressurizing the stack for the impregnation.

[Embodiment 32] The method of manufacturing according to any one of Embodiments 10 to 31, wherein the contained amount of a carbon fiber bundle having a filament number of 0.5 K or more in the carbon fiber mat is 99% by weight or more.

[Embodiment 33] The method of manufacturing according to any one of Embodiments 10 to 32, wherein the removal includes removing the fiber dust while it is floating.

[Embodiment 34] A fiber mat deposition apparatus disposed above a conveyance path and used for depositing a carbon fiber mat on a carrier film that travels on the conveyance path with its surface horizontal, the fiber mat deposition apparatus comprising: a chopping part for cutting a continuous carbon fiber bundle into short carbon fiber bundles; and a dispersing part disposed below the chopping part for allowing the short carbon fiber bundles to fall onto the carrier film while dispersing them using a dispersing roll having a rotation axis parallel to a T direction, wherein the dispersing part is disposed on the inside of an enclosure, and at least one end of a shaft of the dispersing roll protrudes to the outside of the enclosure through an opening provided in the enclosure.

[Embodiment 35] A fiber mat deposition apparatus disposed above a conveyance path and used for depositing a carbon fiber mat on a carrier film that travels on the conveyance path with its surface horizontal, the fiber mat deposition apparatus comprising: a chopping part for cutting a continuous carbon fiber bundle into short carbon fiber bundles; and a dispersing part disposed below the chopping part for allowing the short carbon fiber bundles to fall onto the carrier film while dispersing them using a dispersing roll having a rotation axis parallel to a T direction, wherein the dispersing part is disposed on the inside of an enclosure, each of both ends of a shaft of the dispersing roll protrudes out of the enclosure through an opening provided in the enclosure, and a pair of bearings supporting the shaft are both disposed on the outside of the enclosure.

[Embodiment 36] The fiber mat deposition apparatus according to Embodiment 34 or 35, wherein the dispersing roll is provided with a collar which is adjacent to the opening on the inside of the enclosure, and on a plane perpendicular to the T direction an orthographic projection of the opening falls inside an outline of an orthographic projection of the collar.

[Embodiment 37] The fiber mat deposition apparatus according to embodiment 36, wherein a gap between the collar and the enclosure is 5 mm or less.

[Embodiment 38] The fiber mat deposition apparatus according to any one of Embodiments 34 to 37, wherein an electric motor and a power transmission system for driving the dispersing roll are arranged on the outside of the enclosure.

[Embodiment 39] The fiber mat deposition apparatus according to any one of Embodiments 34 to 38, wherein the enclosure is formed of metal plates and is grounded.

[Embodiment 40] A fiber mat deposition apparatus comprising: a chopping part for cutting a continuous carbon fiber bundle into short carbon fiber bundles; and a dispersing part disposed below the chopping part and configured for allowing the short carbon fiber bundles to fall onto a carrier film while dispersing them using a dispersing roll, wherein the dispersing part is disposed on the inside of an enclosure, and the enclosure is formed of metal plates and is grounded.

[Embodiment 41] The fiber mat deposition apparatus according to any one of Embodiments 34 to 40, wherein the enclosure is provided such that the chopping part is disposed on the inside of the enclosure.

[Embodiment 42] The fiber mat deposition apparatus according to any one of Embodiments 34 to 41, wherein a suction nozzle connected to a dust collector is disposed at an upper end of the enclosure.

[Embodiment 43] The fiber mat deposition apparatus according to Embodiment 41, wherein an upper end of the enclosure is closed with a ceiling board.

[Embodiment 44] The fiber mat deposition apparatus according to Embodiment 41, wherein a suction hood connected to a dust collector is disposed above the chopping part.

[Embodiment 45] The fiber mat deposition apparatus according to Embodiment 44, wherein there is no gap between the suction hood and the enclosure.

[Embodiment 46] The fiber mat deposition apparatus according to any one of Embodiments 34 to 45, wherein a suction nozzle connected to a dust collector is disposed on the inside of the enclosure.

[Embodiment 47] The fiber mat deposition apparatus according to any one of Embodiments 34 to 46, wherein the enclosure is provided with an air outlet, which is connected to a dust collector.

[Embodiment 48] The fiber mat deposition apparatus according to any one of Embodiments 34 to 47, further comprising an air inlet which is disposed on the inside of the enclosure and is connected to a blower or an air compressor.

[Embodiment 49] The fiber mat deposition apparatus according to any one of Embodiments 34 to 48, further comprising an air inlet which is provided in the enclosure and is connected to a blower or an air compressor.

[Embodiment 50] The fiber mat deposition apparatus according to any one of Embodiments 34 to 49, wherein the dispersing roll is a pin roll or a cage roll.

[Embodiment 51] The fiber mat deposition apparatus according to any one of Embodiments 34 to 50, wherein the dispersing roll has n-fold rotational symmetry (provided that n is an integer of 1 or more, is finite, and is preferably 72 or less) about the rotation axis thereof.

[Embodiment 52] A method of manufacturing a carbon fiber mat, the method comprising using the fiber mat deposition apparatus according to any one of Embodiments 34 to 51.

[Embodiment 53] A method of manufacturing a sheet molding compound, the method comprising: depositing a carbon fiber mat by using the fiber mat deposition apparatus according to any one of Embodiments 34 to 51, and impregnating the carbon fiber mat with a thermosetting resin composition.

[Embodiment 54] Use of the fiber mat deposition apparatus according to any one of Embodiments 34 to 51 for manufacturing of a sheet molding compound.

[Embodiment 55] Use of the fiber mat deposition apparatus according to any one of Embodiments 34 to 51 in a sheet molding compound manufacturing apparatus.

[Embodiment 56] The use according to Embodiment 55, wherein the sheet molding compound manufacturing apparatus comprises two applicators, a laminator, and an impregnator.

[Embodiment 57] A sheet molding compound manufacturing apparatus comprising the fiber mat deposition apparatus according to any one of Embodiments 34 to 51.

[Embodiment 58] The sheet molding compound manufacturing apparatus according to Embodiment 57, further comprising two applicators, a laminator, and an impregnator.

[Embodiment 59] A sheet molding compound manufacturing apparatus comprising a fiber mat deposition apparatus, two applicators, a laminator, an impregnator, and one or more dust collectors, which may include a cyclone dust collector.

[Embodiment 60] The sheet molding compound manufacturing apparatus according to Embodiment 59, wherein the fiber mat deposition apparatus has a chopping part for cutting a continuous carbon fiber bundle into short carbon fiber bundles, and a dispersing part disposed below the chopping part for allowing the short carbon fiber bundles to fall onto a carrier film while dispersing them using a dispersing roll.

[Embodiment 61] The sheet molding compound manufacturing apparatus according to Embodiment 60, wherein the dispersing roll is a pin roll or a cage roll.

[Embodiment 62] The sheet molding compound manufacturing apparatus according to Embodiment 60 or 61, wherein the dispersing roll has n-fold rotational symmetry (provided that n is an integer of 1 or more, is finite, and is preferably 72 or less) about the rotation axis thereof.

[Embodiment 63] The sheet molding compound manufacturing apparatus according to any one of Embodiments 60 to 62, wherein in the fiber mat deposition apparatus, the dispersing part is disposed on the inside of an enclosure.

[Embodiment 64] The sheet molding compound manufacturing apparatus according to Embodiment 63, wherein the enclosure is provided such that the chopping part is disposed on the inside of the enclosure.

[Embodiment 65] The sheet molding compound manufacturing apparatus according to Embodiment 63 or 64, wherein a suction nozzle connected to at least any of the one or more dust collectors is disposed at an upper end of the enclosure.

[Embodiment 66] The sheet molding compound manufacturing apparatus according to Embodiment 64, wherein an upper end of the enclosure is closed with a ceiling board.

[Embodiment 67] The sheet molding compound manufacturing apparatus according to Embodiment 65, wherein a suction hood connected to at least any of the one or more dust collectors is disposed above the chopping part.

[Embodiment 68] The sheet molding compound manufacturing apparatus according to Embodiment 67, wherein there is no gap between the suction hood and the enclosure.

[Embodiment 69] The sheet molding compound manufacturing apparatus according to any one of Embodiments 63 to 68, wherein a suction nozzle connected to at least any of the one or more dust collectors is disposed on the inside of the enclosure.

[Embodiment 70] The sheet molding compound manufacturing apparatus according to any one of Embodiments 63 to 69, wherein the enclosure is provided with an air outlet, which is connected to at least any of the one or more dust collectors.

[Embodiment 71] The sheet molding compound manufacturing apparatus according to any one of Embodiments 63 to 70, further comprising an air inlet which is disposed on the inside of the enclosure and is connected to a blower or an air compressor.

[Embodiment 72] The sheet molding compound manufacturing apparatus according to any one of Embodiments 63 to 71, further comprising an air inlet which is provided in the enclosure and is connected to a blower or an air compressor.

[Embodiment 73] The sheet molding compound manufacturing apparatus according to any one of Embodiments 63 to 72, wherein the enclosure is formed of metal plates and is grounded.

[Embodiment 74] A method of manufacturing a CF-SMC, comprising using the sheet molding compound manufacturing apparatus according to any one of Embodiments 57 to 73.

The present invention has been described above in line with specific embodiments; however, each of the embodiments has been presented as examples and dose not limit the scope of the present invention. Each embodiment described in the present specification can be variously modified to the extent that the effects of the invention are achieved, and can be combined with features described by other embodiments to the extent practicable.

INDUSTRIAL APPLICABILITY

A CF-SMC manufactured using the method or apparatus according to the embodiments is used for molding CFRP products using, for example, a compression molding method. CFRP products that can be manufactured using the CF-SMC have a wide range of applications, including manned aircraft, unmanned aircraft, automobiles, ships, railway vehicles, and various other transportation equipment, sporting goods, and leisure goods.

REFERENCE SIGNS LIST

10: Continuous carbon fiber bundle
20: Short carbon fiber bundle
30: Carbon fiber mat
41: First carrier film 42: Second carrier film
51: First resin paste
51L: First resin paste layer
52: Second resin paste
52L: Second resin paste layer
60: Stack
70: Laminator
100: SMC manufacturing apparatus
110: First applicator
120: Second applicator
130: Fiber mat deposition apparatus
140: Impregnator
150: Chopping part
151: Cutter roll
152: Receiving roll (rubber roll)
153: Guide roll
160: Dispersing part
161: First pin roll
162: Second pin roll
164: Cage roll
170: Enclosure
171: Enclosure (upper part)
172: Enclosure (lower part)
173: Ceiling board
174: Grounding point
180: Suction nozzle
180a: Suction opening-forming part
181: Hose
182: Dust collector
184: Suction hood
191: Hose
192: Blower
193: Air inlet
194: Air compressor
195: Air supply nozzle
200: Rod group

What is claimed is:

1. A method of manufacturing a sheet molding compound using a fiber mat deposition apparatus comprising a chopping part and a dispersing part disposed below the chopping part, the method comprising:

drawing out a carrier film from a roll to travel on a conveyance path such that a surface of the carrier film is horizontal;

cutting a continuous carbon fiber bundle into short carbon fiber bundles in the chopping part of the fiber mat deposition apparatus disposed above the conveyance path;

allowing the short carbon fiber bundles to fall onto the carrier film traveling on the conveyance path while dispersing the short carbon fiber bundles in the dispersing part of the fiber mat deposition apparatus using a dispersing roll having a rotation axis parallel to a T direction to form a carbon fiber mat on the carrier film;

impregnating the carbon fiber mat with a thermosetting resin composition to obtain a resin-impregnated carbon fiber mat; and concurrently with the forming the carbon fiber mat, removing fiber dust generated from the short carbon fiber bundles due to contact with the dispersing roll using one or more dust collectors, which optionally includes a cyclone dust collector, wherein the dispersing part of the fiber mat deposition apparatus is disposed on an inside of an enclosure of the fiber mat deposition apparatus, the one or more dust collectors is connected to: a suction nozzle disposed on the inside of the enclosure; or a suction hood disposed above the chopping part, the suction nozzle has an opening having a width W, and the width W is 50% or more of an inner dimension of the enclosure.

2. The method of manufacturing according to claim 1, wherein the dispersing roll comprises a pin roll or a cage roll.

3. The method of manufacturing according to claim 1, wherein the dispersing roll has n-fold rotational symmetry, wherein n is an integer of 1 or more and 72 or less, with respect to the rotation axis thereof.

4. The method of manufacturing according to claim 1, wherein at least one end of a shaft of the dispersing roll protrudes to an outside of the enclosure through an opening provided in the enclosure.

5. The method of manufacturing according to claim 1, wherein both ends of a shaft of the dispersing roll protrudes out of the enclosure through an opening provided in the enclosure, and a pair of bearings supporting the shaft are both disposed on the outside of the enclosure.

6. The method of manufacturing according to claim 4, wherein the dispersing roll is provided with a collar, which is placed adjacent to the opening on the inside of the enclosure, and on a plane perpendicular to the T direction an orthographic projection of the opening falls inside an outline of an orthographic projection of the collar.

7. The method of manufacturing according to claim 4, wherein an electric motor and a power transmission system for driving the dispersing roll are arranged on the outside of the enclosure.

8. The method of manufacturing according to claim 1, wherein the enclosure is provided such that the chopping part is disposed on the inside of the enclosure.

9. The method of manufacturing according to claim 8, wherein an upper end of the enclosure is closed with a ceiling board.

10. The method of manufacturing according to claim 1, wherein the enclosure is provided with an air outlet, which is connected to at least one of the one or more dust collectors.

11. The method of manufacturing according to claim 1, further comprising supplying air to the inside of the enclosure concurrently with the forming the carbon fiber mat.

12. The method of manufacturing according to claim 11, wherein the supplying air uses a blower and/or an air compressor to supply the air.

13. The method of manufacturing according to claim 11, wherein an air inlet connected to a blower or an air compressor is disposed on the inside of the enclosure.

14. The method of manufacturing according to claim 11, wherein the enclosure is provided with an air inlet connected to a blower or an air compressor.

15. The method of manufacturing according to claim 1, wherein the enclosure comprises a metal plate and is grounded.

16. The method of manufacturing according to claim 1, wherein before the forming the carbon fiber mat on the carrier film, a resin paste comprising the thermosetting resin composition is applied on one surface of the carrier film, and after the forming the carbon fiber mat, another carrier film with another resin paste comprising the thermosetting resin composition applied on one surface is superposed on the carrier film to form a stack, further followed by pressurizing the stack for the impregnating the carbon fiber mat.

17. The method of manufacturing according to claim 1, wherein the removing fiber dust includes removing floating fiber dust.

* * * * *